(12) United States Patent
Sakai et al.

(10) Patent No.: US 12,360,355 B2
(45) Date of Patent: Jul. 15, 2025

(54) OPTICAL DEVICE AND METHOD OF MANUFACTURING TUBULAR PART-USING PRODUCT

(71) Applicant: LIGHT OPTICAL WORKS, LTD., Nagano (JP)

(72) Inventors: Kensuke Sakai, Nagano (JP); Masaki Imai, Nagano (JP); Hidemi Oguchi, Nagano (JP)

(73) Assignee: LIGHT OPTICAL WORKS, LTD., Nagano (JP)

( * ) Notice: Subject to any disclaimer, the term of this patent is extended or adjusted under 35 U.S.C. 154(b) by 850 days.

(21) Appl. No.: 17/515,537

(22) Filed: Oct. 31, 2021

(65) Prior Publication Data

US 2022/0229281 A1 Jul. 21, 2022

(30) Foreign Application Priority Data

Jan. 15, 2021 (JP) .................................. 2021-004758

(51) Int. Cl.
*G02B 23/16* (2006.01)
*F41G 1/38* (2006.01)
*G02B 25/00* (2006.01)

(52) U.S. Cl.
CPC .............. *G02B 23/16* (2013.01); *F41G 1/38* (2013.01); *G02B 25/001* (2013.01)

(58) Field of Classification Search
None
See application file for complete search history.

(56) References Cited

U.S. PATENT DOCUMENTS

| 8,806,798 | B2 * | 8/2014 | Crispin | F41G 1/38 |
| | | | | 74/553 |
| 2008/0066364 | A1 * | 3/2008 | Klepp | F41G 1/38 |
| | | | | 42/122 |

(Continued)

FOREIGN PATENT DOCUMENTS

| DE | 102009050089 | 4/2011 |
| JP | 2004150699 | 5/2004 |
| WO | 2020148714 | 7/2020 |

OTHER PUBLICATIONS

"Office Action of Germany Counterpart Application", issued on Jan. 24, 2025, with English translation thereof, pp. 1-11.

*Primary Examiner* — Derek S. Chapel
(74) *Attorney, Agent, or Firm* — JCIPRNET

(57) ABSTRACT

An optical device includes an impact position adjusting part which is an operation adjusting part. The impact position adjusting part includes a rotating operation part, a shaft part, a fixed tubular part which is a first tubular part formed with outer peripheral recesses-projections, and a rotating tubular part which is a second tubular part formed with inner peripheral recesses-projections. According to an operation of a user, the rotating operation part moves together with the rotating tubular part to a rotatable position at which the outer peripheral recesses-projections and the inner peripheral recesses-projections are separated, and a rotation prohibited position at which the outer peripheral recesses-projections and the inner peripheral recesses-projections are engaged. In a vicinity of an end part on a side close to the rotating tubular part, a width of a projection of the outer peripheral recesses-projections of the fixed tubular part gradually decreases toward the end part.

6 Claims, 12 Drawing Sheets

(56) References Cited

U.S. PATENT DOCUMENTS

| | | | |
|---|---|---|---|
| 2015/0034463 A1* | 2/2015 | Breich | H01H 19/025 200/17 R |
| 2017/0328674 A1* | 11/2017 | VanBecelaere | G02B 7/004 |
| 2020/0056859 A1* | 2/2020 | Walker | G02B 7/02 |
| 2020/0278179 A1 | 9/2020 | Ding et al. | |
| 2022/0090879 A1* | 3/2022 | Walker | F41G 1/545 |

* cited by examiner

OPTICAL DEVICE AND METHOD OF MANUFACTURING TUBULAR PART-USING PRODUCT

CROSS-REFERENCE TO RELATED APPLICATION

This application claims the priority benefit of Japan application serial no. 2021-004758, filed on Jan. 15, 2021. The entirety of the above-mentioned patent application is hereby incorporated by reference herein and made a part of this specification.

BACKGROUND

Technical Field

The disclosure relates to an optical device and a method of manufacturing a tubular part-using product.

Description of Related Art

Conventionally, regarding optical devices such as an optical sight installed on a hunting gun and a sports gun, a configuration provided with an adjusting mechanism for focus adjustment, ballistic correction, etc. is known (see, for example, Patent Document 1: Japanese Patent Application Laid-Open No. 2004-150699). Further, Patent Document 1 discloses a lock mechanism of the adjusting mechanism for focus adjustment.

When a lock mechanism is provided for the adjusting mechanism of the optical device, for example, it is possible to appropriately prevent an adjustment result from being displaced due to unintentional contact of the user's hand or an object with an operating part for adjustment. However, depending on the configuration of the lock mechanism, for example, sometimes the user may be given an impression that locking has been completed while it is actually in the unlocked state. As a result, the adjusting mechanism may not be appropriately locked. Therefore, conventionally, there has been a demand for a configuration capable of more appropriately adjusting the configuration for adjusting the function of the optical device.

SUMMARY

The configuration for adjusting the function of the optical device may be, for example, a configuration using a rotating operation part that rotates according to a user's operation. In this case, the lock mechanism may be realized by using, for example, recesses-projections formed on a rotating side tubular part which is a tubular part that rotates together with a rotating operation part, and recesses-projections formed on a fixed side tubular part which is a non-rotating tubular part. Specifically, in this case, for example, the rotating operation part and the rotating side tubular part may be moved forward and backward in a direction parallel to an axial direction of the rotating side tubular part, and by engagement between the recesses-projections of the rotating side tubular part and the recesses-projections of the fixed side tubular part at a predetermined position, rotation of the rotating operation part can be prohibited. Further, in this case, for example, by an operation of pushing the rotating operation part by the user, one of the rotating side tubular part and the fixed side tubular part may accommodate at least a part of the other, and the recesses-projections of the rotating side tubular part and the recesses-projections of the fixed side tubular part may be engaged with each other. With such a configuration, for example, the lock mechanism of the configuration for adjusting the function of the optical device can be appropriately realized.

However, in the case of such a lock mechanism, for example, before the recesses-projections of the rotating side tubular part and the recesses-projections of the fixed side tubular part are surely engaged with each other, the user may be given an impression that it is in the locked state. Specifically, for example, at the time when the rotating side tubular part and the fixed side tubular part come into contact with each other during the operation of pushing the rotating operation part by the user, as the projection of the recesses-projections of the rotating side tubular part and the projection of the recesses-projections of the fixed side tubular part collide with each other, the user may be given the impression that the pushing has been completed. As a result, while actually in the unlocked state, the user may be given the impression of being in the locked state.

In this regard, the inventors of the present application have conducted diligent research on a configuration in which such misrecognition is less likely to occur. Then, it is conceivable to use a configuration in which the recesses-projections of the rotating side tubular part and the fixed side tubular part are more naturally engaged with each other after the rotating side tubular part and the fixed side tubular part come into contact with each other. Specifically, as such a configuration, of the rotating side tubular part and the fixed side tubular part, at least the tubular part on which recesses-projections are formed on an outer peripheral surface may use a configuration in which the width of the projection gradually decreases toward an end part on a side close to the other tubular part. With this configuration, for example, after the rotating side tubular part and the fixed side tubular part come into contact with each other, the recesses-projections of the two can be more naturally engaged with each other. Further, for example, it is possible to appropriately prevent giving the user an impression of being in the locked state while it is actually in the unlocked state.

Further, the inventors of the present application have found features for obtaining such an effect through further diligent research and have obtained the disclosure. To solve the above problems, the disclosure relates to an optical device, which is an optical device enabling a user to visually recognize a target object, including an optical system, a housing, and an operation adjusting part. The optical system enables the user to visually recognize the target object. The housing houses the optical system. The operation adjusting part adjusts a function of the optical device according to an operation of the user. The operation adjusting part includes a rotating operation part, an adjusting mechanism, a first tubular part, and a second tubular part. The rotating operation part rotates according to an operation of the user. The adjusting mechanism adjusts the function of the optical device by moving a part of the optical device according to an amount of rotation of the rotating operation part. The first tubular part is in a tubular shape and is formed with recesses-projections on at least a part of an outer peripheral surface. The second tubular part is in a tubular shape and is formed with inner peripheral recesses-projections on at least a part of an inner peripheral surface, the inner peripheral recesses-projections being recesses-projections having a shape that engages with outer peripheral recesses-projections which are the recesses-projections on the outer peripheral surface of the first tubular part. A rotating side tubular part, which is one of the first tubular part and the second tubular part, has an axial direction parallel to a rotation axis of the rotating operation part and has a position fixed to the rotating operation part to rotate together with the rotating operation part. Another of the first tubular part and the second tubular part has an axial direction aligned with the rotating side tubular part and is arranged at a position fixed to the housing. The outer peripheral recesses-projections of the first tubular part are recesses-projections of which projections and recesses extending in a direction parallel to an axial direction of the first tubular part are alternately arranged in a circumferential direction of the outer peripheral surface. The rotating operation part is capable of moving forward and backward in a direction parallel to the axial direction of the first tubular part, and according to an operation of the user, moves together with the rotating side tubular part to at least a rotatable position at which rotation of the rotating operation part is made possible by separation between the outer peripheral recesses-projections and the inner peripheral recesses-projections, and a rotation prohibited position at which rotation of the rotating operation part is prohibited by engagement between the outer peripheral recesses-projections and the inner peripheral recesses-projections. At least in a vicinity of an end part on a side close to the second tubular part, a width of the projection of the outer peripheral recesses-projections of the first tubular part gradually decreases toward the end part.

In this configuration, with the width of the projection of the outer peripheral recesses-projections of the first tubular part gradually decreasing toward the end part, for example, in the operation of moving the rotating operation part from the rotatable position to the rotation prohibited position, the outer peripheral recesses-projections of the first tubular part and the inner peripheral recesses-projections of the second tubular part can be more naturally engaged. Accordingly, for example, it is possible to appropriately prevent giving the user the impression of being in the locked state while it is actually in the unlocked state. Therefore, with such a configuration, for example, it is possible to appropriately realize a configuration capable of more appropriately adjusting a configuration for adjusting the function of the optical device.

Such an optical device may be, for example, an optical sight used by being attached to a gun Further, the operation adjusting part may be, for example, an adjusting part for performing impact position adjustment in the optical sight. With this configuration, for example, when performing impact position adjustment on the optical sight, the lock mechanism can be realized more appropriately. Further, the operation adjusting part may also be, for example, an adjusting part for purposes other than impact position adjustment in the optical sight. In this case, the operation adjusting part may be, for example, a focus adjusting part, an illumination adjusting part, etc. Further, the operation adjusting part may also be an adjusting part other than the above. Further, the operation adjusting part may also be, for example, an adjusting part in an optical device other than the optical sight.

Further, in this configuration, specifically, for example, the second tubular part is the rotating side tubular part. Further, at least at a part other than the vicinity of the end part on the side close to the second tubular part, for example, the projections of the outer peripheral recesses-projections of the first tubular part are arranged at a constant cycle in the circumferential direction with a constant width in the circumferential direction. Then, in the vicinity of the end part on the side close to the second tubular part, the width of the projection of the outer peripheral recesses-projections of the first tubular part in the circumferential direction gradually decreases toward the end part as described above. In this case, the width of the recess of the outer peripheral recesses-projections in the circumferential direction gradually increases, for example, toward the end part as the width of the adjacent projections decreases. Further, when moving the rotating operation part from the rotatable position to the rotation prohibited position, for example, the outer peripheral recesses-projections of the first tubular part guide movement of the second tubular part by the projections of which the width gradually decreases toward the end part so that the outer peripheral recesses-projections and the inner peripheral recesses-projections are engaged with each other. With this configuration, for example, when moving the rotating operation part from the rotatable position to the rotation prohibited position, the outer peripheral recesses-projections of the first tubular part and the inner peripheral recesses-projections of the second tubular part can be appropriately and naturally engaged with each other.

Further, at least in the vicinity of the end part on the side close to the second tubular part, a depth and a width of the recess of the outer peripheral recesses-projections of the first tubular part gradually increase toward the end part, for example. By forming such a recess, for example, a projection of which the width gradually decreases toward the end part can be appropriately formed. Specifically, the recess of the outer peripheral recesses-projections of the first tubular part is a recess in a shape of a V-shaped groove of which a width gradually increases as a distance from a bottom increases. Then, in this case, at least in the vicinity of the end part on the side close to the second tubular part, for example, with a position of the bottom of the recess in a shape of a V-shaped groove gradually becoming deeper toward the end part, the depth and the width of the recess of the outer peripheral recesses-projections of the first tubular part gradually increase toward the end part. By forming such a recess, for example, a projection of which the width gradually decreases toward the end part can be formed more appropriately.

Further, the features of the disclosure may also be considered by paying attention to, for example, steps of creating the first tubular part and the like. Further, in this case, not only the configuration of the optical device, but it is also possible to consider the features of a method of manufacturing a tubular part-using product. In this case, for example, the disclosure relates to a method of manufacturing a tubular part-using product, which is a product using a plurality of tubular parts, the method including the following steps. In a first tubular part creating step, a first tubular part in a tubular shape is created to be formed with recesses-projections on at least a part of an outer peripheral surface. In a second tubular part creating step, a second tubular part in a tubular shape is created to be formed with inner peripheral recesses-projections on at least a part of an inner peripheral surface, the inner peripheral recesses-projections being recesses-projections having a shape that engages with outer peripheral recesses-projections which are the recesses-projections on the outer peripheral surface of the first tubular part. The outer peripheral recesses-projections of the first tubular part are recesses-projections of which projections and recesses extending in a direction parallel to an axial direction of the first tubular part are alternately arranged in a circumferential direction of the outer peripheral surface. In the first tubular part creating step, a cutting tool having a blade for cutting is used; with the blade pressed against the first tubular part to be processed, by moving the blade relative to the first tubular part in a direction gradually away from a central axis of the first tubular part while advancing in a direction parallel to the axial direction of the first tubular part, a part of the recess of the outer peripheral recesses-projections of the first tubular part is formed; and afterwards, with the blade pressed against the first tubular part, by keeping a distance from the central axis of the first tubular part constant and moving the blade relative to the first tubular part, another part of the recess of the outer peripheral recesses-projections is formed, so that at least in a vicinity of an end part, the projection of the outer peripheral recesses-projections of the first tubular part is formed so that a width of the projection gradually decreases toward the end part.

With this configuration, for example, it is possible to appropriately form, on the first tubular part, outer peripheral recesses-projections having a projection of which the width gradually decreases toward the end part. The blade of the cutting tool may be, for example, a blade in a shape that forms a recess in a shape of a V-shaped groove of which a width gradually increases as a distance from a bottom increases by moving relative to a work piece while being pressed against the work piece. Further, in this case, in the first tubular part creating step, for example, the recess of the outer peripheral recesses-projections of the first tubular part may be formed so that a depth and a width of the recess gradually increase toward the end part. With this configuration, for example, the outer peripheral recesses-projections of the first tubular part can be formed more appropriately.

BRIEF DESCRIPTION OF THE DRAWINGS

FIG. 2(a) and FIG. 2(b) are a perspective view and a cross-sectional view showing an example of components constituting a main part of the impact position adjusting part 22.

FIG. 3(a) is a cross-sectional view showing the impact position adjusting part 22 in an unlocked state. FIG. 3(b) is a cross-sectional view showing the impact position adjusting part 22 in a locked state.

FIG. 4(a) shows an example of a state in which locking is correctly performed. FIG. 4(b) shows an example of misrecognition that occurs at the time of locking.

FIG. 6(a) and FIG. 6(b) show the positional relationship between the fixed tubular part 106 and a bit 502 at the time of forming the outer peripheral recesses-projections.

FIG. 10(a) is a top view showing the projection 622 and the recess 624 as viewed from the normal direction of the outer peripheral surface of the fixed tubular part 606. FIG. 10(b) and FIG. 10(c) are cross-sectional views at positions of line AA and line BB.

FIG. 11(a) is a top view showing the projection 222 and the recess 224 as viewed from the normal direction of the outer peripheral surface of the fixed tubular part 106.

FIG. 11(b) and FIG. 11(c) are cross-sectional views at positions of line AA and line BB.

FIG. 12(a) and FIG. 12(b) show modified examples of the configurations of the rotating tubular part 124 and the fixed tubular part 106 in the impact position adjusting part 22.

DESCRIPTION OF THE EMBODIMENTS

According to embodiments of the disclosure, for example, it is possible to appropriately realize a configuration capable of more appropriately adjusting a configuration for adjusting a function of an optical device.

Figure 1:
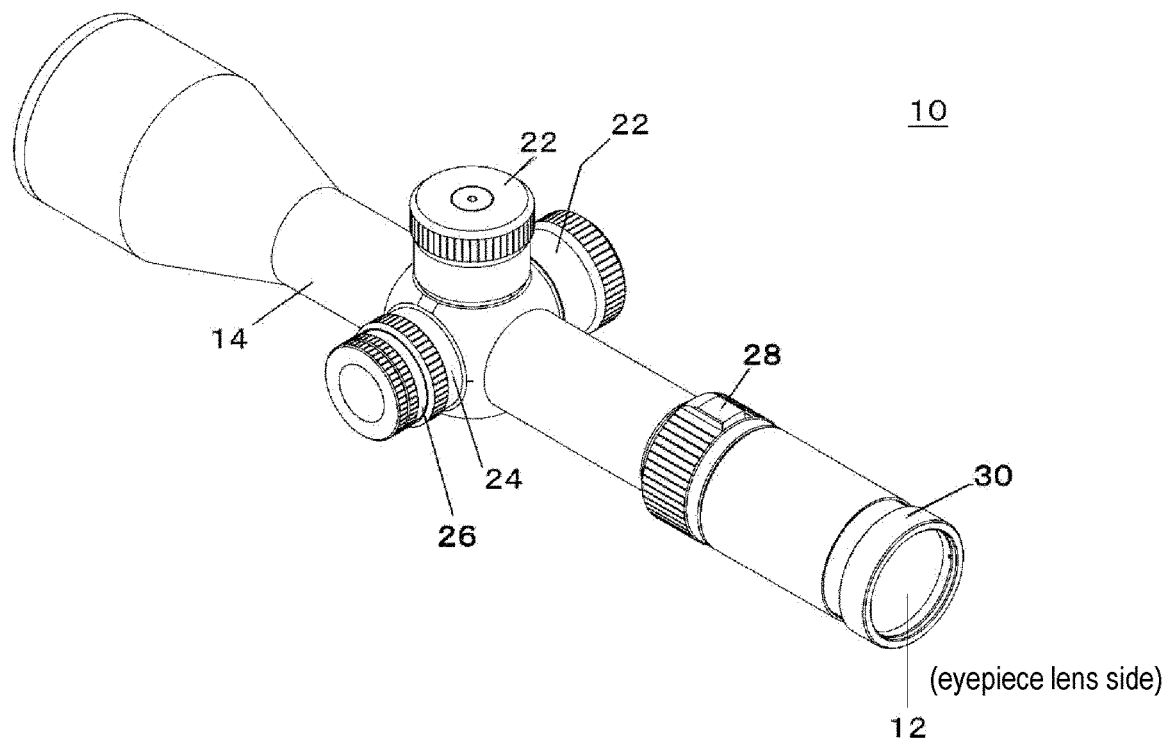
FIG. 1 is a view showing an example of a configuration of an optical sight 10 according to an embodiment of the disclosure.

Hereinafter, embodiments according to the disclosure will be described with reference to the drawings. FIG. 1 shows an example of a configuration of an optical sight 10 according to an embodiment of the disclosure. The optical sight 10 is an example of an optical device that enables a user to visually recognize a target object and is used by being attached to a gun such as a hunting gun or a sports gun. Specifically, in the present example, the optical sight 10 is attached to a long-range shooting gun (e.g., a rifle) and magnifies a distant target object of shooting such as a hunting prey or a shooting target to enable a user to visually recognize it. In this case, the optical sight 10 may be, for example, an aiming telescope having a telescopic function. The optical sight 10 may also be, for example, a scope (e.g., a scope for a rifle) attached to a gun. Further, the optical sight 10 may have the same or similar characteristics as a known optical sight 10 except for the points described below. For example, except for the points described below, configurations having the same functions as known configurations may be suitably used as the configurations of each part of the optical sight 10.

Further, in the present example, the optical sight 10 includes an optical system 12, a housing 14, a plurality of impact position adjusting parts 22, a focus adjusting part 24, an illumination adjusting part 26, a magnification adjusting part 28, and a diopter adjusting part 30. The optical system 12 is an optical system including a plurality of lenses such as an eyepiece lens and an objective lens, and by orienting the objective lens side toward the front side of the gun and orienting the eyepiece lens side toward the rear side of the gun, a user who is the shooter of the gun can visually recognize the target object of shooting. The housing 14 is a housing that houses the optical system 12. Further, in the present example, the housing 14 is fixedly attached to a predetermined position on the gun by using, for example, a mount (not shown).

Each of the plurality of impact position adjusting parts 22, the focus adjusting part 24, the illumination adjusting part 26, the magnification adjusting part 28, and the diopter adjusting part 30 is an example of an operation adjusting part and adjusts the function of the optical sight 10 according to the user's operation. In the present example, the adjustment of the function of the optical sight 10 may refer to, for example, adjustment of the optical characteristics and aiming of the optical sight 10. Further, among these configurations for adjustment, the impact position adjusting parts 22 are adjusting parts for performing impact position adjustment, which is adjustment of the relationship between an impact point (impact position) of a bullet of the gun to which the optical sight 10 is attached and an optical axis direction of the optical sight 10. In this case, for example, the impact point may be adjusted by performing adjustment with the impact position adjusting parts 22 according to a distance to a target point. The impact position adjusting part 22 may be, for example, an adjusting part that performs adjustment for aligning the target point of the gun and the impact point. Further, the impact position adjusting part 22 may also be, for example, an adjusting part that adjusts the optical axis direction of the optical sight 10 with respect to the orientation of a barrel. Further, each of the impact position adjusting parts 22 may be, for example, an adjusting part that adjusts each of an elevation angle and a deflection angle of the optical axis direction of the optical sight 10.

Further, in the present example, the optical sight 10 includes, as the plurality of impact position adjusting parts 22, an impact position adjusting part 22 for adjusting the impact position in the horizontal direction and an impact position adjusting part 22 for adjusting the impact position in the vertical direction. Specifically, in the case of the configuration shown in FIG. 1, the impact position adjusting part 22 located on one side in the left-right direction of the optical sight 10 while attached to the gun is the impact position adjusting part 22 for adjusting the impact position in the horizontal direction. This impact position adjusting part 22 may be located, for example, at a position opposite to the focus adjusting part 24 and the illumination adjusting part 26 with the housing 14 interposed therebetween. Further, the impact position adjusting part 22 located on the upper side in the vertical direction while attached to the gun is the impact position adjusting part 22 for adjusting the impact position in the vertical direction. Further, in the present example, each of the impact position adjusting parts 22 has a predetermined lock mechanism. A more specific configuration and the lock mechanism of the impact position adjusting part 22 will be described in more detail later. Further, except for the lock mechanism, the impact position adjusting parts 22 may have, for example, the same or similar characteristics as known impact position adjusting parts.

Further, the focus adjusting part 24 is an adjusting part for adjusting the focus of the optical sight 10. The illumination adjusting part 26 is an adjusting part for adjusting the illumination function. The magnification adjusting part 28 is an adjusting part that adjusts the magnification of the optical sight 10. The diopter adjusting part 30 is an adjusting part that adjusts the diopter with respect to the reticle mounted on the optical sight 10. Each of these adjustment configurations has, for example, the same or similar configuration as known adjustment configurations according to the purpose of adjustment. Further, at least a part among these adjusting parts may also have a configuration having the same or similar lock mechanism as the lock mechanism of the impact position adjusting part 22 to be described below. According to the present example, it is possible to appropriately provide an optical sight 10 capable of various adjustments associated with optical characteristics and aiming, for example.

Figure 2A:
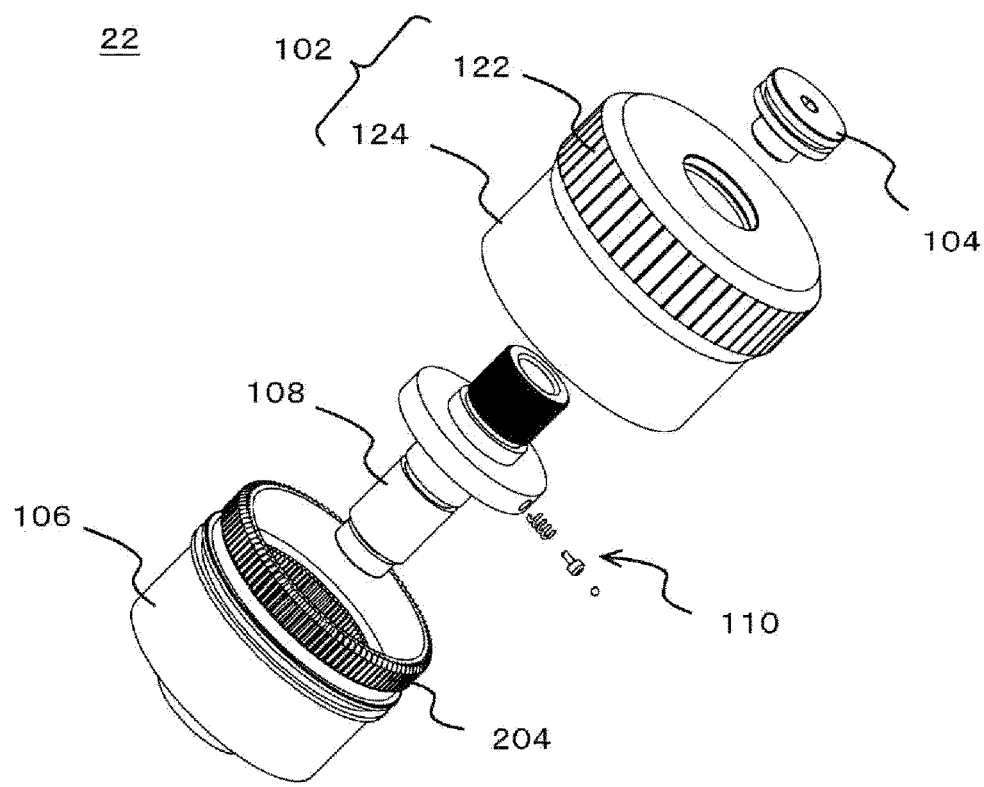
FIG. 2(a) and FIG. 2(b) are views showing components constituting a main part of an impact position adjusting part 22.
Figure 2B:
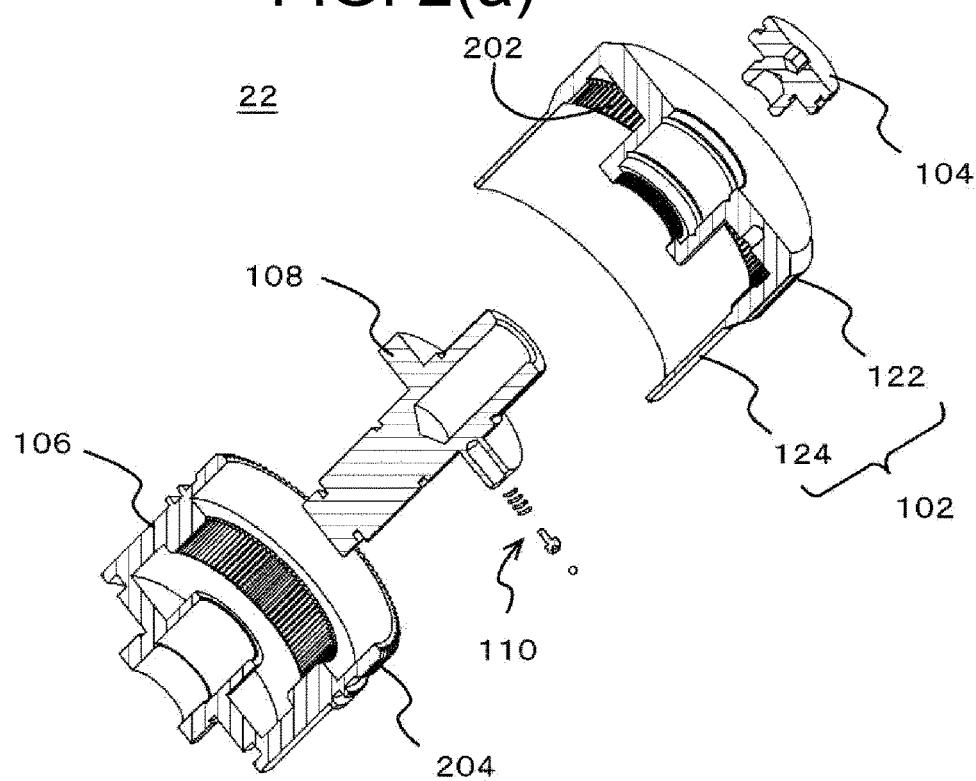
Figure 3A:
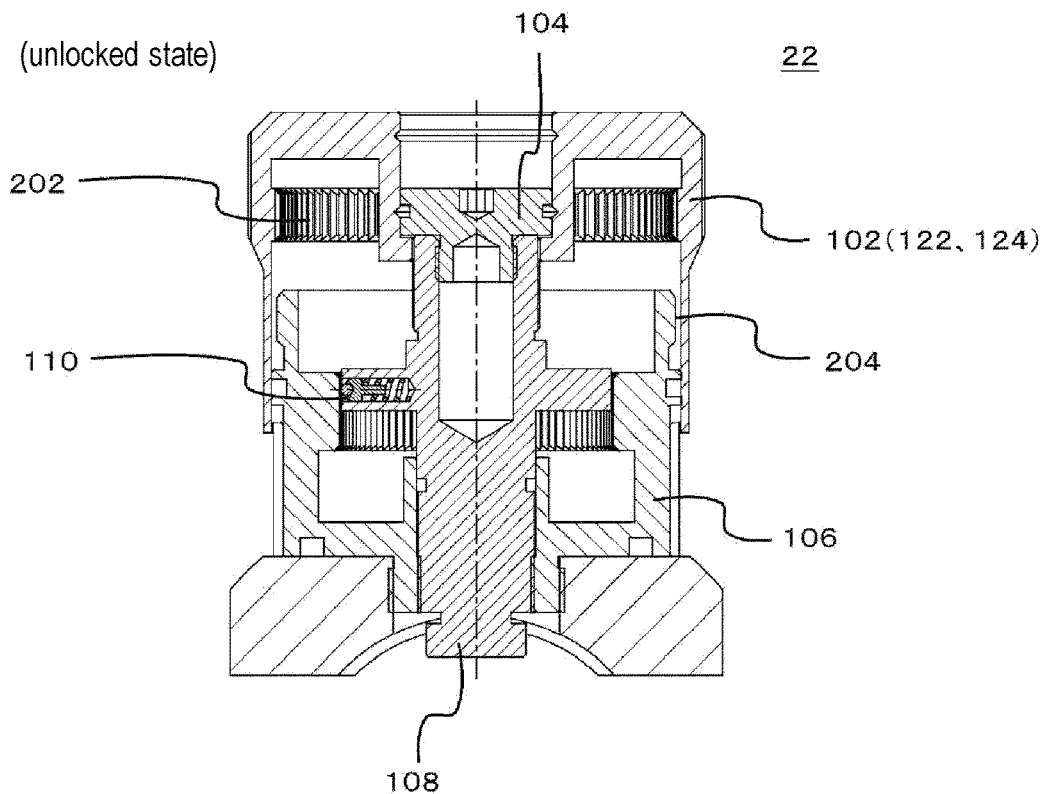
FIG. 3(a) and FIG. 3(b) are views showing a lock mechanism of the impact position adjusting part 22.
Figure 3B:
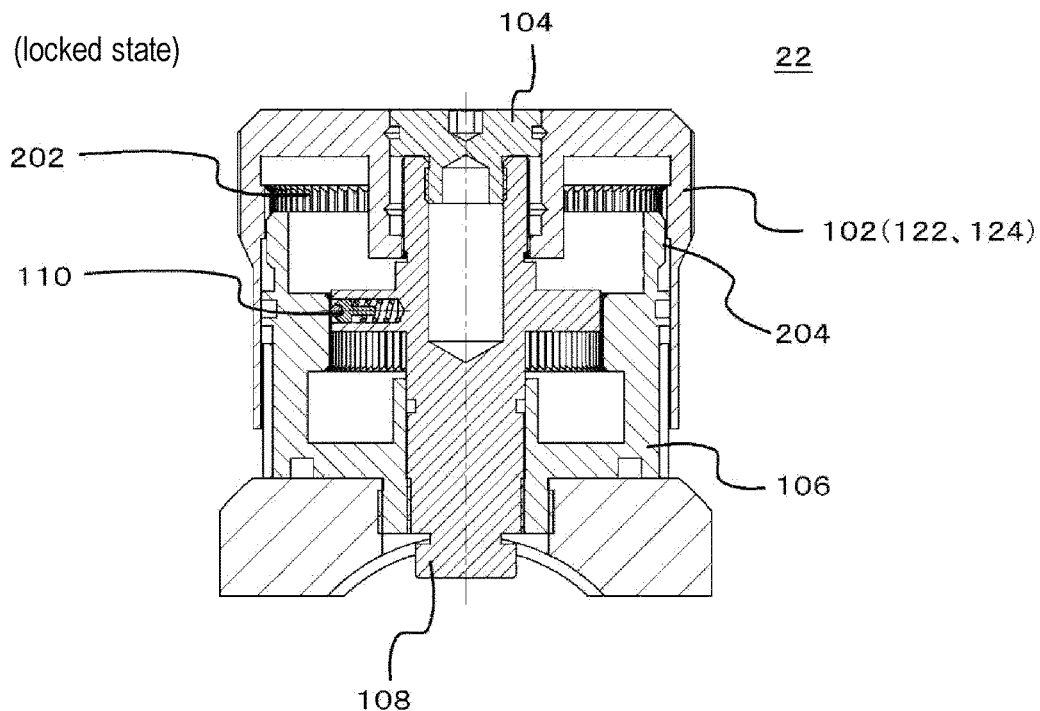

Next, the features of the impact position adjusting part 22 will be described in more detail. FIG. 2(a), FIG. 2(b), FIG. 3(a), and FIG. 3(b) are views showing the configuration and function of the optical sight 10. FIG. 2(a) and FIG. 2(b) are views showing components constituting a main part of the impact position adjusting part 22. FIG. 2(a) and FIG. 2(b) are a perspective view and a cross-sectional view showing an example of components constituting a main part of the impact position adjusting part 22. FIG. 3(a) and FIG. 3(b) are views showing the lock mechanism of the impact position adjusting part 22. FIG. 3(a) is a cross-sectional view showing the impact position adjusting part 22 in an unlocked state, i.e., a state in which the lock mechanism is not locked. FIG. 3(b) is a cross-sectional view showing the impact position adjusting part 22 in a locked state, i.e., a state in which the lock mechanism is locked. Further, as shown in the figures, in the present example, each of the impact position adjusting parts 22 has a rotating part 102, an upper cap 104, a fixed tubular part 106, a shaft part 108, and a click ball part 110. Further, the rotating part 102 has a rotating operation part 122 and a rotating tubular part 124. Among these configurations, the fixed tubular part 106 is an example of a first tubular part in a tubular shape in which outer peripheral recesses-projections are formed on at least a part of the outer peripheral surface. The rotating tubular part 124 is an example of a second tubular part in a tubular shape in which inner peripheral recesses-projections having a shape that engages with the outer peripheral recesses-projections of the first tubular part are formed on at least a part of the inner peripheral surface.

The rotating part 102 is a portion that directly rotates according to the user's operation, and has a rotating operation part 122 and a rotating tubular part 124 as described above. Further, in the present example, each of the rotating operation part 122 and the rotating tubular part 124 forms a part of the rotating part 102 formed as one component. In this case, the formation of the rotating part 102 as one component may refer to, for example, forming portions functioning as the rotating operation part 122 and the rotating tubular part 124 to be continuously and integrally connected instead of being assembled using multiple individually processed components. Further, more specifically, in the present example, the rotating part 102 having the rotating operation part 122 and the rotating tubular part 124 is formed by processing one metal material. In a modified example of the configuration of the rotating part 102, for example, the rotating operation part 122 and the rotating tubular part 124 may be respectively composed of separate components. In this case, the rotating part 102 may be, for example, a member (e.g., a two-body object) composed of multiple components.

Further, in this case, among the portions constituting the rotating part 102, the rotating operation part 122 may be, for example, a portion that realizes a rotating function according to the user's operation by receiving an operation by the user. Further, the rotating tubular part 124 may be, for example, a portion that rotates together with the rotating operation part 122 by fixing the position with respect to the rotating operation part 122. Further, for example, the axial direction of the rotating tubular part 124 may be made parallel to the rotation axis of the rotating operation part 122 and the position of the rotating tubular part 124 may be fixed with respect to the rotating operation part 122 so as to rotate together with the rotating operation part 122. In this case, the rotation axis of the rotating operation part 122 may be, for example, the rotation axis in the case where the rotating operation part 122 rotates according to the user's operation when adjusting the impact position. Further, the axial direction of the rotating tubular part 124 may be, for example, a direction corresponding to the axial direction of a cylinder in the case where the shape of the rotating tubular part 124 is approximated by a cylinder.

Further, in the present example, the inner peripheral surface of the rotating tubular part 124 is formed with inner peripheral recesses-projections 202, which are recesses-projections composed of projections and recesses extending in a direction parallel to the axial direction of the rotating tubular part 124 and alternately arranged in the circumferential direction of the inner peripheral surface. In this case, for example, the tubular portion of the rotating part 102 including at least the portion formed with the inner peripheral recesses-projections 202 may form the portion corresponding to the rotating tubular part 124. Further, the portion of the rotating part 102 other than the rotating tubular part 124 may form the portion corresponding to the rotating operation part 122. Further, in the present example, the inner peripheral recesses-projections 202 are recesses-projections used to realize the lock mechanism of the impact position adjusting part 22, and are recesses-projections having a shape that engages with outer peripheral recesses-projections 204 of the fixed tubular part 106 to be described in detail later. Further, the engagement between the inner peripheral recesses-projections 202 and the outer peripheral recesses-projections 204 may refer to, for example, fitting the projections of the inner peripheral recesses-projections 202 into the recesses of the outer peripheral recesses-projections 204, and fitting the projections of the outer peripheral recesses-projections 204 into the recesses of the inner peripheral recesses-projections 202. Further, in a state in which the inner peripheral recesses-projections 202 and the outer peripheral recesses-projections 204 are engaged with each other, for example, the inner peripheral recesses-projections 202 and the outer peripheral recesses-projections 204 may mesh with each other so that the rotating tubular part 124 is prohibited from rotating in the circumferential direction of the rotating tubular part 124 relative to the fixed tubular part 106.

Further, the rotating part 102 is formed with a hole into which the shaft part 108 is inserted at the position of the rotation axis of the rotating operation part 122. In the present example, this hole is a hole that is connected to the space inside the rotating tubular part 124 and penetrates to the upper surface of the rotating part 102. The upper cap 104 is a cap member that closes this hole from the upper surface side of the rotating part 102 so that the rotating part 102 does not come off. The fixed tubular part 106 is a tubular part that realizes the lock mechanism of the impact position adjusting part 22 together with the rotating tubular part 124 of the rotating part 102. In the present example, as shown in FIG. 3(a) and FIG. 3(b), the fixed tubular part 106 is axially aligned with the rotating tubular part 124 and is arranged at a position fixed to the housing 14 (see FIG. 1) of the optical sight 10. For example, the fixed tubular part 106 may be fixed to the housing 14 so as not to rotate together with the rotating part 102. Further, as described above, in the present example, the outer peripheral surface of the fixed tubular part 106 is formed with the outer peripheral recesses-projections 204. Further, the inner peripheral surface of the fixed tubular part 106 is formed with recesses-projections against which the steel ball of the click ball part 110 is pressed. The locking function realized by the rotating tubular part 124 and the fixed tubular part 106 will be described in more detail later.

The shaft part 108 is a shaft-shaped member that extends in a direction parallel to the rotation axis at the position of the rotation axis of the rotating operation part 122, and rotates together with the rotating operation part 122 by being fixed to the rotating operation part 122 by a known method. Further, in the present example, by displacing the optical axis direction of the optical system 12 (see FIG. 1) with respect to the housing 14 of the optical sight 10 according to the amount of rotation, the shaft part 108 performs the operation of adjustment with the impact position adjusting part 22. Further, in the present example, the shaft part 108 is an example of an adjusting mechanism of the operation adjusting part. In this case, the adjusting mechanism may be, for example, a mechanism that performs adjustment associated with the function of the optical sight 10 by moving a part of the optical sight 10 according to the amount of rotation of the rotating operation part 122. Further, this adjusting mechanism may also be a mechanism that performs adjustment associated with the function of the optical sight 10 together with another configuration by linking with the another configuration. In this case, the portion combining the shaft part 108 and the another configuration linking with the shaft part 108 may be also an example of the adjusting mechanism. The click ball part 110 is a configuration for generating a click feeling according to the amount of rotation when the rotating operation part 122 is rotated. In the present example, the click ball part 110 has a steel ball, a holding member, and a spring, and the holding member holding the steel ball is urged by the spring housed in a hole formed in the shaft part 108 so that the steel ball is pressed against the recesses-projections of the inner peripheral surface of the fixed tubular part 106.

Here, the characteristics of the inner peripheral recesses-projections 202 of the rotating tubular part 124 and the outer peripheral recesses-projections 204 of the fixed tubular part 106, and the locking function realized by the rotating tubular part 124 and the fixed tubular part 106 will be described in more detail. In the present example, the inner peripheral recesses-projections 202 and the outer peripheral recesses-projections 204 may be, for example, serration-shaped recesses-projections that engage with each other. Further, the shapes of the inner peripheral recesses-projections 202 and the outer peripheral recesses-projections 204 may also be, for example, straight knurled recesses-projections, splined recesses-projections, serrated recesses-projections, or the like. Further, in the present example, the inner peripheral recesses-projections 202 of the rotating tubular part 124 are recesses-projections of which projections and recesses extending in a direction parallel to the axial direction of the rotating tubular part 124 are alternately arranged in the circumferential direction of the inner peripheral surface of the rotating tubular part 124. The projections and the recesses constituting the inner peripheral recesses-projections 202 are arranged in the circumferential direction of the inner peripheral surface of the rotating tubular part 124 at a constant cycle. Further, each projection of the inner peripheral recesses-projections 202 extends in the axial direction of the rotating tubular part 124 with a constant width in the circumferential direction of the inner peripheral surface of the rotating tubular part 124. Further, each recess of the inner peripheral recesses-projections 202 also extends in the axial direction of the rotating tubular part 124 with a constant width in the circumferential direction of the inner peripheral surface of the rotating tubular part 124. In this case, the width of the recess in the circumferential direction may be different from the width of the projection. Further, the width of the projection and the width of the recess may differ depending on the position in the height direction (depth direction) orthogonal to the inner peripheral surface of the rotating tubular part 124. Specifically, the recess of the inner peripheral recesses-projections 202 may be formed as, for example, a recess having a V-shaped cross section (a recess in the shape of a V-shaped groove). In this case, the widths of the recess and the projection may change depending on the position in the height direction according to the shape of the recess having a V-shaped cross section.

Further, in the present example, the outer peripheral recesses-projections 204 of the fixed tubular part 106 are recesses-projections of which projections and recesses extending in a direction parallel to the axial direction of the fixed tubular part 106 are alternately arranged in the circumferential direction of the outer peripheral surface. The projections and the recesses constituting the outer peripheral recesses-projections 204 are arranged in the circumferential direction of the outer peripheral surface of the fixed tubular part 106 at a constant cycle. Further, in the present example, except in the vicinity of an end part on a side close to the rotating tubular part 124, each projection of the outer peripheral recesses-projections 204 extends in the axial direction of the fixed tubular part 106 with a constant width in the circumferential direction of the outer peripheral surface of the fixed tubular part 106. In this case, the end part on the side close to the rotating tubular part 124 may be, for example, an end part close to the rotating tubular part 124 in the unlocked state shown in FIG. 3(*a*). Further, for example, at least at a part other than the vicinity of the end part on the side close to the rotating tubular part 124, such projections of the outer peripheral recesses-projections 204 may be arranged at a constant cycle in the circumferential direction with a constant width in the circumferential direction of the fixed tubular part 106. Further, except in the vicinity of the end part on the side close to the rotating tubular part 124, each recess of the outer peripheral recesses-projections 204 also extends in the axial direction of the fixed tubular part 106 with a constant width in the circumferential direction of the outer peripheral surface of the fixed tubular part 106. Further, in the outer peripheral recesses-projections 204, the width of the recess in the circumferential direction may be different from the width of the projection. Further, the width of the projection and the width of the recess may differ depending on the position in the height direction (depth direction) orthogonal to the outer peripheral surface of the fixed tubular part 106. Specifically, the recess of the outer peripheral recesses-projections 204 may be formed as, for example, a groove having a V-shaped cross section. In this case, the widths of the recess and the projection may change depending on the position in the height direction according to the shape of the recess having a V-shaped cross section.

Further, in the present example, the width of the projection of the outer peripheral recesses-projections 204 in the vicinity of the end part on the side close to the rotating tubular part 124 gradually decreases toward the end part. In this case, the gradual decrease in the width of the projection toward the end part may mean, for example, that the width is gradually narrow as it approaches the end part, when the width of the projection is viewed with the position in the height direction being constant. Further, in the present example, the width of the recess gradually increases toward the end part according to the change in the width of the projection. In this case, the gradual increase in the width of the recess toward the end part may mean, for example, that the width gradually increases as it approaches the end part, when the width of the recess is viewed with the position in the height direction (depth direction) being constant. Further, for example, the width of the recess in the circumferential direction of the outer peripheral recesses-projections 204 may also gradually increase toward the end part as the width of the adjacent projections decreases. The shapes of the projection and the recess of the outer peripheral recesses-projections 204 will be described in more detail later.

Further, as can be understood from the comparison between the unlocked state and the locked state shown in FIG. 3(*a*) and FIG. 3(*b*), in the present example, the rotating part 102, which is the portion including the rotating operation part 122 and the rotating tubular part 124, may move forward and backward in a direction parallel to the axial direction of the rotating tubular part 124. In this case, for example, the rotating operation part 122 may move together with the rotating tubular part 124 according to the user's operation. Further, in the present example, according to the user's operation, the rotating operation part 122 at least moves to a rotatable position at which the impact position adjusting part 22 is in the unlocked state and a rotation prohibited position at which the impact position adjusting part 22 is in the locked state. In this case, the rotatable position may be, for example, a position at which rotation of the rotating operation part 122 is made possible by separation between the inner peripheral recesses-projections 202 of the rotating tubular part 124 and the outer peripheral recesses-projections 204 of the fixed tubular part 106.

Further, the separation between the inner peripheral recesses-projections 202 and the outer peripheral recesses-projections 204 may refer to, for example, coming into a position at which the inner peripheral recesses-projections 202 and the outer peripheral recesses-projections 204 are not engaged with each other, as shown in the figure. Further, the rotation prohibited position may be, for example, a position at which rotation of the rotating operation part 122 is prohibited by engagement between the inner peripheral recesses-projections 202 and the outer peripheral recesses-projections 204. The prohibition of the rotation of the rotating operation part 122 may refer to, for example, prohibiting the rotating operation part 122 and the rotating tubular part 124 from rotating in the circumferential direction of the rotating tubular part 124 relative to the fixed tubular part 106. The prohibition of rotation may mean, for example, that depending on the precision required for the locking function, rotation is substantially prohibited so that it can be regarded as locked.

According to the present example, for example, by pushing the rotating operation part 122 at the position of the unlocked state, the state of the impact position adjusting part 22 can be changed to the locked state. Further, by pulling back the rotating operation part 122 in the locked state, the locked state of the impact position adjusting part 22 can be appropriately released. Further, in the present example, as described above, by configuring the shape of the projection of the outer peripheral recesses-projections 204 of the fixed tubular part 106 to have a width that gradually decreases toward the end part, for example, the impact position adjusting part 22 can be locked more appropriately without causing misrecognition to the user. Therefore, this point will be described in more detail below.

Figure 4A:
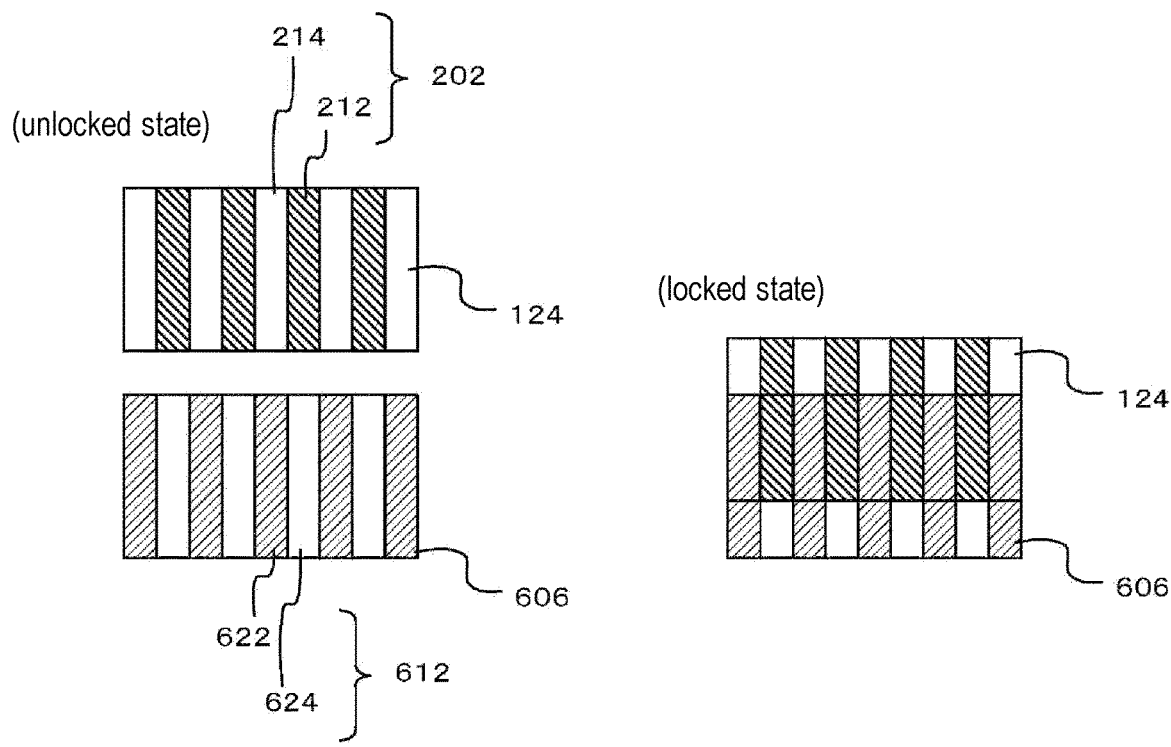
FIG. 4(a) and FIG. 4(b) are views showing misrecognition that occurs at the time of locking the impact position adjusting part 22.
Figure 4B:
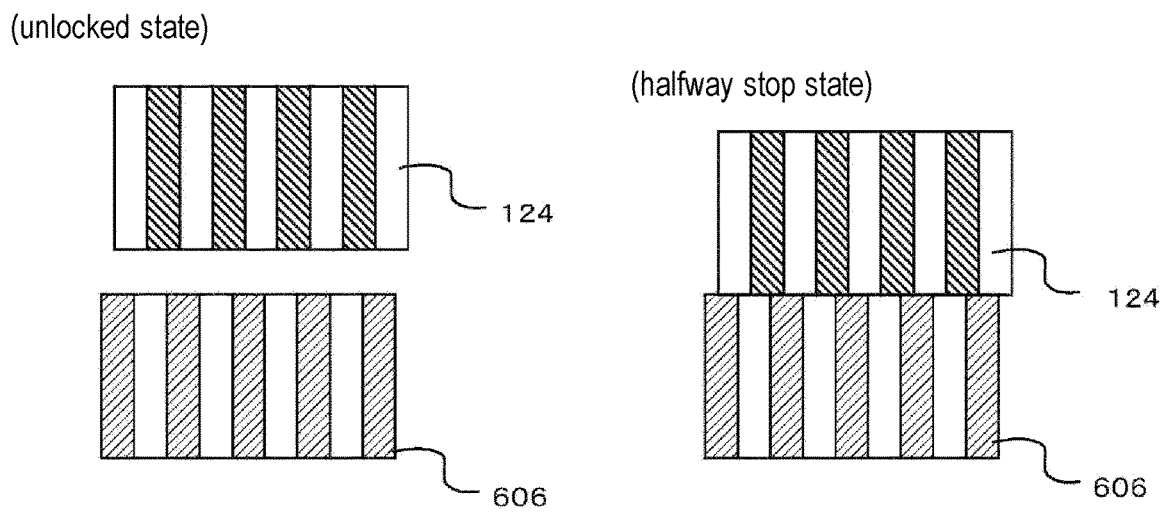

First, for convenience of illustration, an example of misrecognition that occurs at the time of locking the impact position adjusting part 22 will be described. FIG. 4(*a*) and FIG. 4(*b*) are views showing misrecognition that occurs at the time of locking the impact position adjusting part 22, and shows an example of misrecognition that occurs in the case of using an impact position adjusting part having a configuration partially different from the impact position adjusting part 22 of the present example. FIG. 4(a) shows an example of a state in which locking is correctly performed. FIG. 4(b) shows an example of misrecognition that occurs at the time of locking. Specifically, in the case shown in FIG. 4(a) and FIG. 4(b), in place of the fixed tubular part 106 (see FIG. 2(a) and FIG. 2(b)) described above, a fixed tubular part 606 in which only the shape of the outer peripheral recesses-projections is different from the fixed tubular part 106 is used. On the outer peripheral surface of the fixed tubular part 606, outer peripheral recesses-projections 612 are formed by projections 622 and recesses 624 in place of the outer peripheral recesses-projections of the fixed tubular part 106. Further, the projection 622 and the recess 624 of the outer peripheral recesses-projections 612 of the fixed tubular part 606 have a width in the circumferential direction of the outer peripheral surface of the fixed tubular part 606 that is constant over the axial direction of the fixed tubular part 606.

Similarly, when the fixed tubular part 606 having such a configuration is used, for example, as shown in FIG. 4(a), by engaging the inner peripheral recesses-projections 202 of the rotating tubular part 124 with the outer peripheral recesses-projections 612 of the fixed tubular part 606, the impact position adjusting part can be brought into the locked state. However, in this case, depending on the method of contact between the rotating tubular part 124 and the fixed tubular part 606, in the operation of pushing the rotating operation part 122 (see FIG. 2(a) and FIG. 2(b)) of the rotating part 102 into the locked state, for example, as shown by a halfway stop state in FIG. 4(b), before the inner peripheral recesses-projections 202 of the rotating tubular part 124 and the outer peripheral recesses-projections 612 of the fixed tubular part 606 are appropriately engaged, the user may be given an impression that the movement of the rotating operation part 122 (movement of the rotating tubular part 124) has been completed. Specifically, in this case, for example, in the operation of pushing the rotating operation part 122 by the user, at the time point when the rotating tubular part 124 and the fixed tubular part 606 come into contact with each other, since a projection 212 of the inner peripheral recesses-projections 202 of the rotating tubular part 124 and the projection 622 of the outer peripheral recesses-projections 612 of the fixed tubular part 606 collide with each other, the user may be given an impression that the push has been completed. As a result, the user may be given an erroneous impression that it is in the locked state.

Figure 5:
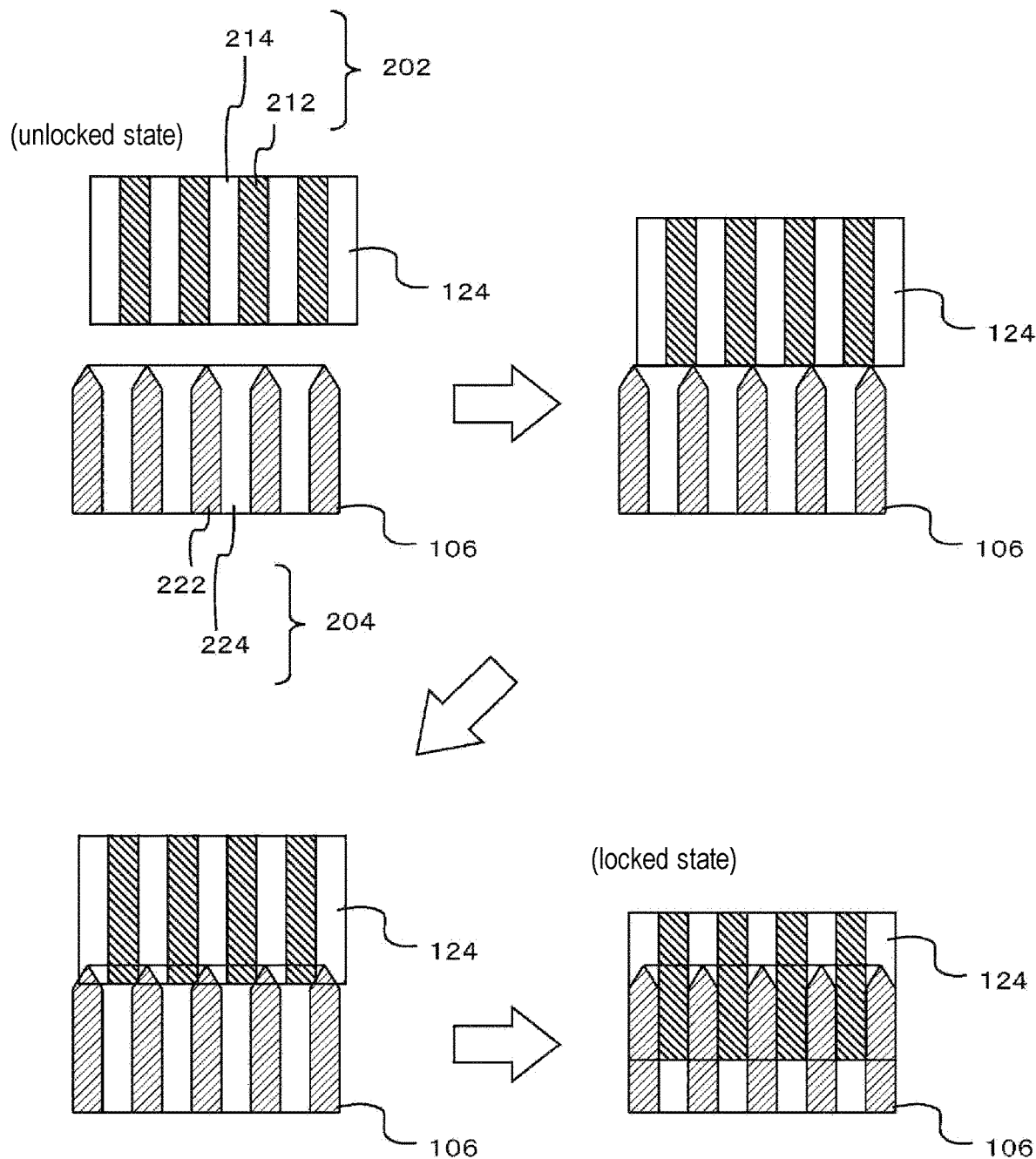
FIG. 5 is a simplified view showing the operation at the time of locking the impact position adjusting part 22.

In contrast, in the present example, as shown in FIG. 5, for example, by configuring the shape of a projection 222 of the outer peripheral recesses-projections 204 of the fixed tubular part 106 to have a width that gradually decreases toward the end part, it is less likely to give such an erroneous impression to the user. FIG. 5 is a simplified view showing the operation at the time of locking the impact position adjusting part 22 in the present example.

In the present example, as can be understood from the shown configuration, with the width of the projection 222 of the outer peripheral recesses-projections 204 in the vicinity of the end part on one side of the fixed tubular part 106 gradually decreasing toward the end part, in the operation of moving the rotating operation part 122 (see FIG. 2(a) and FIG. 2(b)) from the rotatable position to the rotation prohibited position, the outer peripheral recesses-projections 204 of the fixed tubular part 106 and the inner peripheral recesses-projections 202 of the rotating tubular part 124 can be more naturally engaged with each other. Specifically, in this case, by using the projection 222 in the shape having a width gradually decreasing toward the end part, for example, it is possible to reduce the probability that the tip of the projection 222 of the outer peripheral recesses-projections 204 of the fixed tubular part 106 and the projection 212 of the inner peripheral recesses-projections 202 of the rotating tubular part 124 come into contact with each other. Further, in this case, even if the tip of the projection 222 of the outer peripheral recesses-projections 204 and the projection 212 of the inner peripheral recesses-projections 202 are temporarily in contact with each other, with the width of the projection 222 being narrow in the vicinity of the end part, the tip of the projection 222 of the outer peripheral recesses-projections 204 may easily escape to the position of a recess 214 of the inner peripheral recesses-projections 202, for example, due to the influence of position fluctuations caused by the operation of pushing the rotating operation part 122. Further, in this case, after the tip of the projection 222 of the outer peripheral recesses-projections 204 moves to the position of the recess 214 of the inner peripheral recesses-projections 202, for example, as shown on the lower left side of FIG. 5, the movement of the rotating tubular part 124 can be guided by the shape of the projection 222 of the outer peripheral recesses-projections 204 in the vicinity of the end part. In this case, the guidance of the movement of the rotating tubular part 124 by the shape of the projection 222 in the vicinity of the end part may refer to, for example, moving the rotating tubular part 124 to a desired position by moving the projection 212 of the inner peripheral recesses-projections 202 of the rotating tubular part 124 along the side surface of the projection 222 of the outer peripheral recesses-projections 204 of the fixed tubular part 106. Further, the inventors of the present application have confirmed the above effects by actually creating the rotating tubular part 124 and the fixed tubular part 106 having the above shapes. According to the present example, for example, when moving the rotating operation part 122 from the rotatable position to the rotation prohibited position, the inner peripheral recesses-projections 202 of the rotating tubular part 124 and the outer peripheral recesses-projections 204 of the fixed tubular part 106 can be appropriately and naturally engaged with each other. Accordingly, for example, it is possible to appropriately prevent giving the user an impression of being in the locked state while it is actually in the unlocked state.

Further, in such an operation, for example, when moving the rotating operation part 122 from the rotatable position to the rotation prohibited position, the movement of the rotating tubular part 124 may be guided by the projection of which the width gradually decreases toward the end part in the outer peripheral recesses-projections 204 of the fixed tubular part 106 so that the outer peripheral recesses-projections 204 and the inner peripheral recesses-projections 202 of the rotating tubular part 124 are engaged with each other. Further, in the present example, the vicinity of the end part of the fixed tubular part 106, which is the range in which the widths of the projection 222 and the recess 224 at the outer peripheral recesses-projections 204 of the fixed tubular part 106 are gradually changed, may be, for example, a range of width that can guide the movement of the rotating tubular part 124. Further, the vicinity of the end part may also be, for example, a range of a part of the fixed tubular part 106 with which such an effect can be obtained. Further, in practice, the range in which the widths of the projection 222 and the recess 224 are gradually changed in the outer peripheral recesses-projections 204 may be, for example, about 5% or less (e.g., about 0.1% to 5%) of the length of the projection 222 and the recess 224 in the axial direction of the fixed tubular part 106. Further, this range is exemplarily a range of about 3% or less.

Next, a method of manufacturing the optical sight 10 will be described. At the time of manufacturing the optical sight 10, for example, the optical sight 10 is manufactured by manufacturing and assembling the components corresponding to the configurations of the optical sight 10 shown in FIG. 1. Further, each component may also be manufactured by combining multiple components as needed. For example, regarding the impact position adjusting part 22, the portion corresponding to the impact position adjusting part 22 is manufactured by manufacturing and assembling the components of the impact position adjusting part 22 shown in FIG. 2(a), FIG. 2(b), FIG. 3(a), and FIG. 3(b). Further, as can be understood from the above description, for example, the impact position adjusting part 22 of the present example may use a plurality of tubular parts such as the fixed tubular part 106 and the rotating tubular part 124. Therefore, the impact position adjusting part 22 and the optical sight 10 may be an example of a tubular part-using product, i.e., a product using a plurality of tubular parts, for example. Further, in this case, the step of creating the fixed tubular part 106 of the impact position adjusting part 22 may be an example of a first tubular part creating step in which the first tubular part is created, for example. The step of creating the rotating part 102 having the rotating tubular part 124 may be an example of a second tubular part creating step in which the second tubular part is created, for example.

Further, in the step of creating the rotating part 102 and the step of creating the fixed tubular part 106, the inner peripheral recesses-projections 202 of the rotating tubular part 124 and the outer peripheral recesses-projections 204 of the fixed tubular part 106 may be formed by using a cutting tool having a cutting blade. In this case, a known bit (cutting bit) or the like may be suitably used as the cutting tool. Further, specifically, the inner peripheral recesses-projections 202 and the outer peripheral recesses-projections 204 may be formed by using a known machine tool such as, for example, a known compound processing machine (NC compound machine).

Further, as described above, in the present example, the projection 222 of the outer peripheral recesses-projections 204 of the fixed tubular part 106 has a shape of which the width gradually decreases toward the end part. Then, in this case, when forming the outer peripheral recesses-projections 204, the bit may be moved relative to the fixed tubular part 106 being processed, for example, by an operation described below with reference to FIG. 6(a), FIG. 6(b), and FIG. 7, so that a recess 224 having a shape corresponding to such a projection 222 is formed.

Figure 6A:
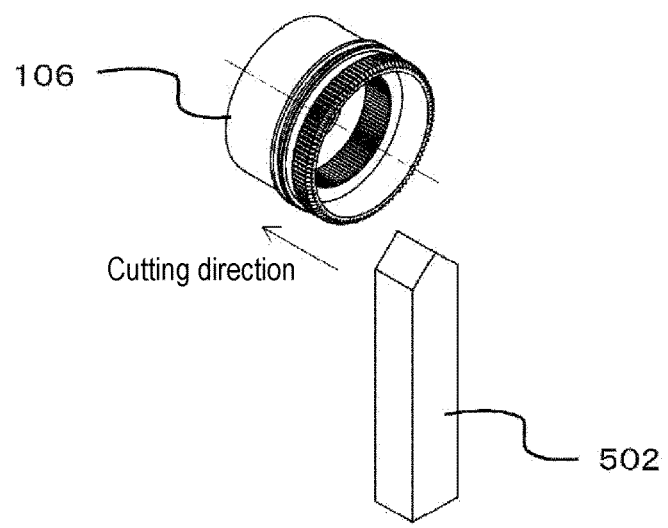
FIG. 6(a) and FIG. 6(b) are views showing an outline of an operation of forming a recess of outer peripheral recesses-projections of a fixed tubular part 106.
Figure 6B:
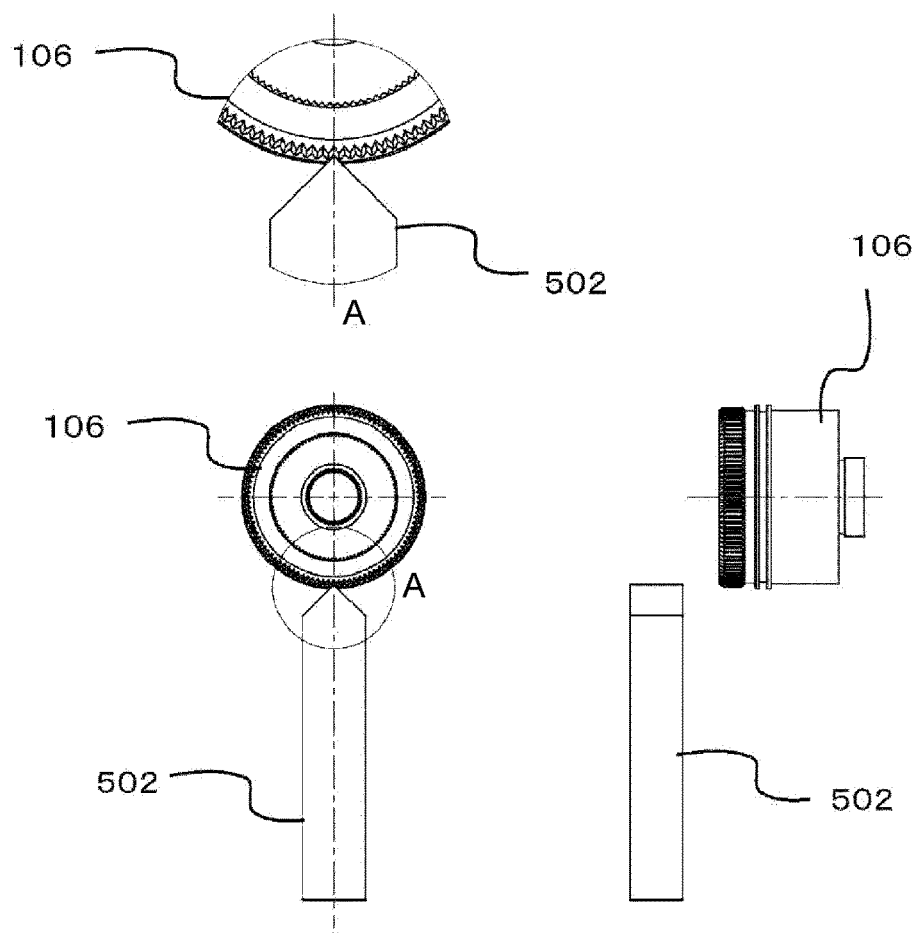
Figure 7:
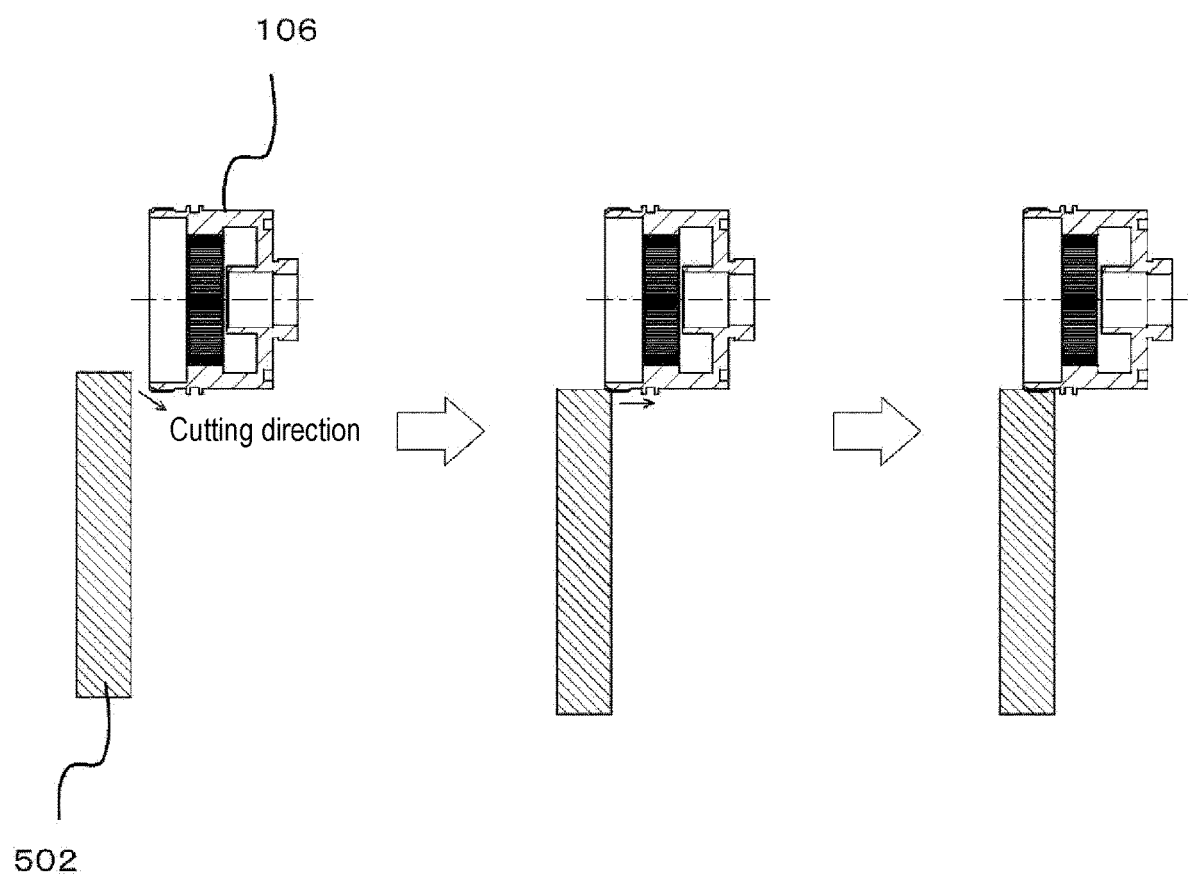
FIG. 7 is a view showing an operation of forming the outer peripheral recesses-projections of the fixed tubular part 106.

FIG. 6(a), FIG. 6(b), and FIG. 7 are views showing an example of an operation of forming the outer peripheral recesses-projections in the step of forming the fixed tubular part 106. FIG. 6(a) and FIG. 6(b) are views showing an outline of an operation of forming a recess of the outer peripheral recesses-projections using a bit 502. FIG. 6(a) and FIG. 6(b) are views showing the positional relationship between the fixed tubular part 106 and the bit 502 at the time of forming the outer peripheral recesses-projections. Further, in FIG. 6(a) and FIG. 6(b), for convenience of illustration, the fixed tubular part 106 before the outer peripheral recesses-projections are formed is shown in a state in which the outer peripheral recesses-projections are formed.

As can be understood from the illustration in the figure, in the present example, using the bit 502 having a blade for forming a recess in the shape of a V-shaped groove, by pressing the blade of the bit 502 against the side surface of the fixed tubular part 106 and moving the bit 502 relative to the fixed tubular part 106, a groove forming the recess of the outer peripheral recesses-projections is formed on the outer peripheral surface of the fixed tubular part 106. In this case, the recess in the shape of a V-shaped groove may be, for example, a groove-shaped recess of which the width gradually increases as the distance from the bottom increases. Further, "the recess of the outer peripheral recesses-projections being in the shape of a V-shaped groove" may mean, for example, that a cross section of the recess along a plane orthogonal to the axial direction of the fixed tubular part 106 has a shape of which the width gradually increases as the distance from the bottom increases. Further, when the bit 502 having the shown configuration is used, the width of the recess may linearly increase according to, for example, the height from the bottom surface.

Further, the blade of the bit 502 having the shown configuration may be, for example, a blade having a shape that forms a recess in the shape of a V-shaped groove by moving relative to a work piece while being pressed against the work piece. In this case, for example, if the depth at which the blade of the bit 502 is pressed against the outer peripheral surface of the fixed tubular part 106 is kept constant and the bit 502 is moved relative to the fixed tubular part 106 in the axial direction of the fixed tubular part 106, a recess having a constant width is formed. The width of the recess being constant may mean, for example, that the width of the recess at the same depth in the depth direction of the recess is constant. Further, in this case, for example, the width of the recess may become wider as the depth at which the blade of the bit 502 is pressed against the outer peripheral surface of the fixed tubular part 106 increases.

Therefore, at the time of forming the outer peripheral recesses-projections, for example, at the portion other than the vicinity of the end part of the fixed tubular part 106 on the side close to the rotating part 102 (the side close to the rotating tubular part 124), a recess of a constant width may be formed by keeping the depth at which the blade of the bit 502 is pressed constant and moving the bit 502 relative to the fixed tubular part 106, for example, in a cutting direction shown in FIG. 6(a). Further, in this case, the widths of the recess and the projection may be gradually changed, for example, by forming the recess of the outer peripheral recesses-projections while gradually changing the depth at which the blade of the bit 502 is pressed against the vicinity of the end part of the fixed tubular part 106 on the side close to the rotating part 102, as shown in FIG. 7.

FIG. 7 is a view showing an operation of forming the outer peripheral recesses-projections of the fixed tubular part 106. In the present example, when forming the outer peripheral recesses-projections of the fixed tubular part 106, the cutting process for forming each recess of the outer peripheral recesses-projections is started from the side of the end part of the fixed tubular part 106 on the side close to the rotating part 102. In this case, for example, as shown by a cutting direction in the left view of FIG. 7, the recess of the outer peripheral recesses-projections is formed in the vicinity of one end part of the fixed tubular part 106 by moving the bit 502 relative to the fixed tubular part 106 in a direction non-parallel to the axial direction of the fixed tubular part 106. Specifically, in this case, for example, a part of the recess is formed by cutting a groove forming the recess toward an opposite side of the fixed tubular part 106 while gradually increasing the distance from the central axis of the fixed tubular part 106 to the blade of the bit 502. For example, the cutting direction in this operation may be a direction of which an inclination with respect to the axial direction of the fixed tubular part 106 is about 20° to 70°. This inclination is exemplarily about 30° to 60°. Further, in such an operation, for example, a part of the recess of the outer peripheral recesses-projections of the fixed tubular part 106 may be formed in the following manner: with the blade of the bit 502 pressed against the fixed tubular part 106 to be processed, moving the blade of the bit 502 relative to the fixed tubular part 106 in a direction gradually away from the central axis of the fixed tubular part 106 while advancing in a direction parallel to the axial direction of the fixed tubular part 106. With this configuration, for example, the width of the recess can be gradually increased toward the end part in the vicinity of one end part of the fixed tubular part 106.

Further, in the present example, after the formation of the portion at which the width of the recess gradually changes is completed, the bit 502 is moved relative to the fixed tubular part 106 in a direction parallel to the axial direction of the fixed tubular part 106 while the distance from the central axis of the fixed tubular part 106 to the blade of the bit 502 is kept constant. Accordingly, a portion of the recess having a constant width is formed on the outer peripheral surface of the fixed tubular part 106. In this case, for example, as shown by an arrow in the central view of FIG. 7, the cutting direction is changed at a predetermined timing so that the cutting direction is parallel to the axial direction of the fixed tubular part 106, and as shown in the right view of FIG. 7, the recess at the portion other than the vicinity of one end part of the fixed tubular part 106 is formed. Further, in such an operation, for example, with the blade of the bit 502 pressed against the fixed tubular part 106, by keeping the distance from the central axis of the fixed tubular part 106 constant and moving the blade of the bit 502 relative to the fixed tubular part 106, another part of the recess of the outer peripheral recesses-projections may also be formed. Further, in the present example, the outer peripheral recesses-projections are formed by sequentially rotating the fixed tubular part 106 according to the cycle of the recesses-projections set in advance and forming the recess at each rotation position. Further, in this case, since the portion sandwiched between adjacent recesses forms a projection, the width of the projection gradually decreases toward the end part. Therefore, with this configuration, in the step of creating the fixed tubular part 106, it is possible to appropriately form the outer peripheral recesses-projections having the projection of which the width gradually decreases toward the end part.

Further, as can be understood from the above description, in the present example, the portion of the recess at which the width gradually changes and the portion at which the width is constant may be continuously formed by a series of operations while maintaining the state in which the blade of the bit 502 is in contact with the outer peripheral surface of the fixed tubular part 106, for example. In this regard, if only gradually changing the widths of the recess and the projection is considered, for example, the bit 502 used for processing the vicinity of the end part and the bit 502 used for processing the portion at which the width of the recess is constant may be different from each other. However, in that case, it is necessary to change the bit 502 in the operation of forming one recess, and a position deviation is likely to occur between the vicinity of the end part and the another portion. Specifically, in the fixed tubular part 106 of the present example, for example, recesses may be formed at positions dividing the circumference along the outer peripheral surface into about 100 equal parts. Then, in that case, if an attempt is made to form the recess using multiple bits 502, alignment becomes difficult and the above deviation is likely to occur. Further, if an attempt is made to align with high precision, the cost and time required for processing may increase significantly. In contrast, according to the present example, by forming the recess having the above shape with one bit 502, it is possible to appropriately process the outer peripheral recesses-projections with high precision.

Further, as described above, in the present example, the blade of the bit 502 is inserted into the fixed tubular part 106 from the side of the end part on the side where the widths of the projection and the recess are gradually changed. With this configuration, for example, it is possible to more easily and appropriately process the outer peripheral recesses-projections on the fixed tubular part 106. Further, depending on the shape of the fixed tubular part 106, for example, the blade of the bit 502 may also be inserted into the fixed tubular part 106 from the side of the end part opposite to the side where the widths of the projection and the recess are gradually changed. In that case, for example, after processing the portion at which the width of the recess is constant, by gradually changing the depth at which the blade of the bit 502 is pressed, it is also possible to gradually decrease the width of the projection and gradually increase the width of the recess toward the end part.

Figure 8:
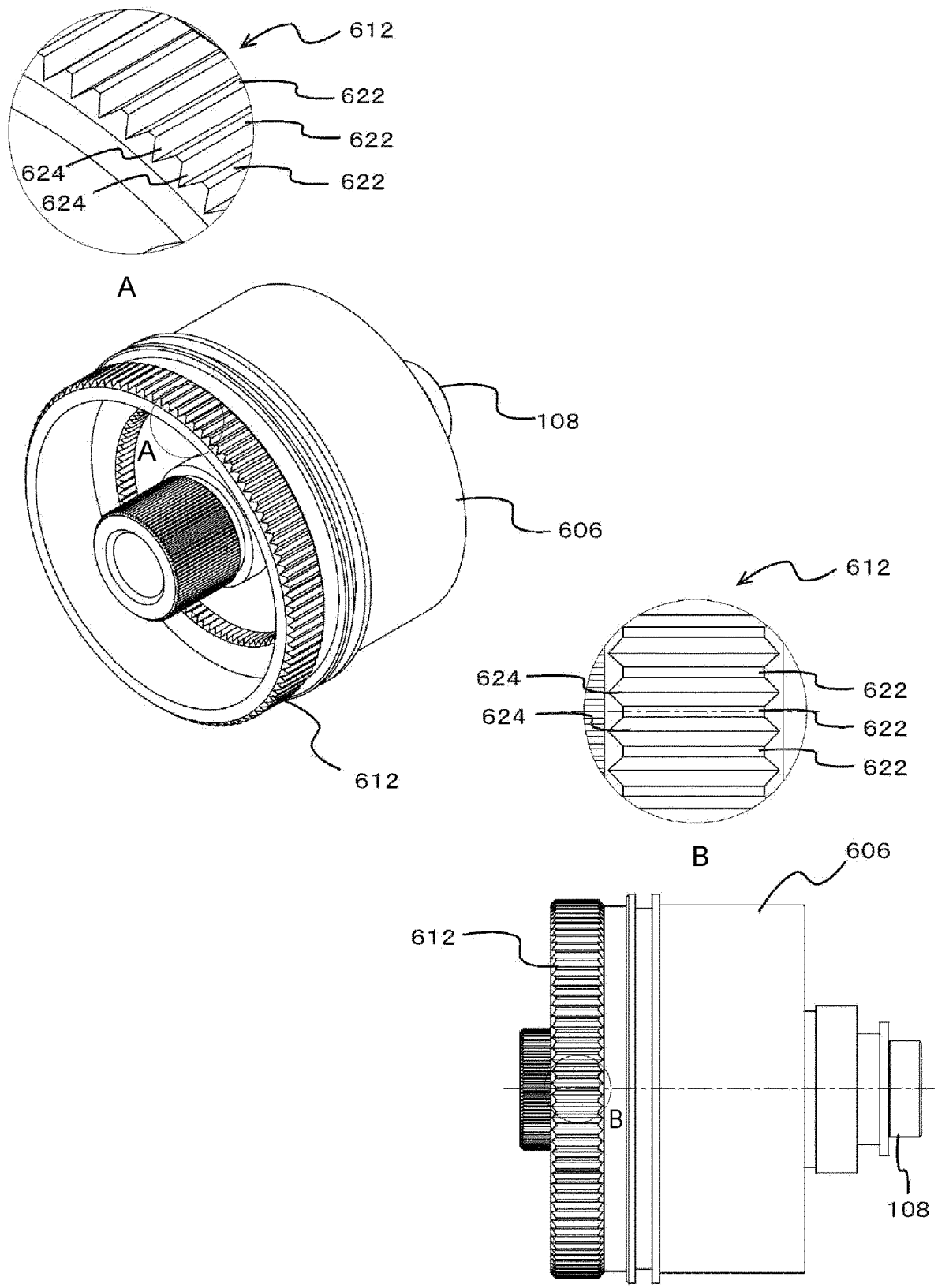
FIG. 8 is a view showing an example of a configuration of a fixed tubular part 606 formed with outer peripheral recesses-projections 612 having a shape different from that of the present example.

Next, the shapes of the projection and the recess of the outer peripheral recesses-projections formed as described above will be described in more detail. FIG. 8 is a view showing an example of the configuration of the fixed tubular part 606 formed with the outer peripheral recesses-projections 612 having a shape different from that of the present example, and shows an example of the configuration of the fixed tubular part 606 together with the shaft part 108 in the case where the outer peripheral recesses-projections 612 having the projection 622 and the recess 624 as described above with reference to FIG. 4(a) and FIG. 4(b) are formed. In FIG. 8, the upper view is a perspective view of the entire fixed tubular part 606 and a portion A. The lower view is a side view of the entire fixed tubular part 606 and a portion B. In this case, the portion A of the fixed tubular part 606 is the portion indicated by a circle A in the perspective view of the entire fixed tubular part 606. The portion B of the fixed tubular part 606 is the portion indicated by a circle B in the side view of the entire fixed tubular part 606. The fixed tubular part 606 shown in FIG. 8 may have, for example, a configuration in which the entire recess 624 is formed by keeping the distance from the central axis to the blade of the bit constant without performing the operation of gradually changing the distance from the central axis of the fixed tubular part 606 to the blade of the bit, when forming the recess 624 of the outer peripheral recesses-projections 612. In this case, as can be understood from the shown configuration, the depth of the recess 624 may be constant over the entire recess 624.

Figure 9:
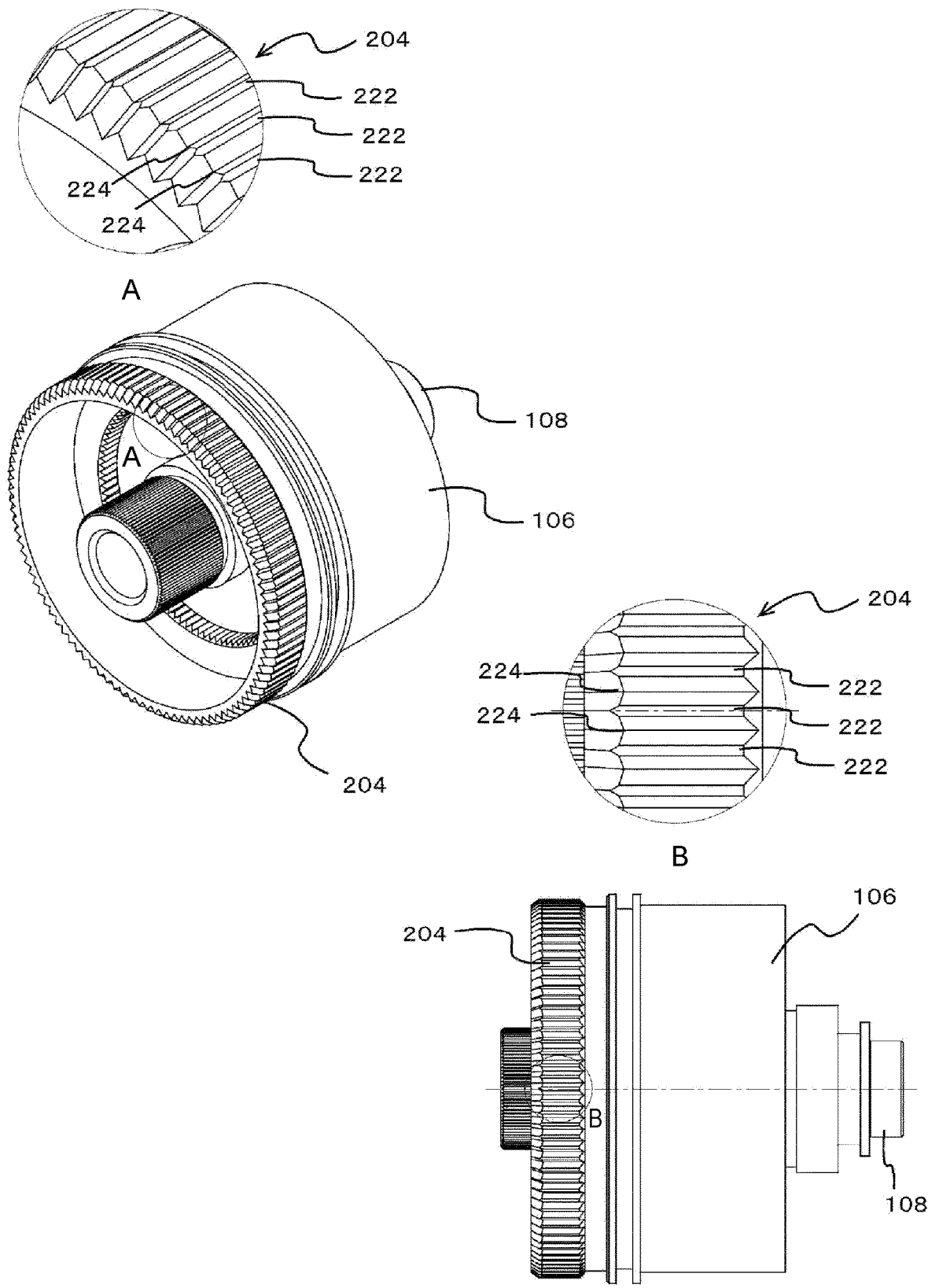
FIG. 9 is a view showing an example of the configuration of the fixed tubular part 106 in the present example.

In contrast, in the present example, the shapes of the projection 222 and the recess 224 of the outer peripheral recesses-projections 204 are, for example, the shapes as shown in FIG. 9. FIG. 9 is a view showing an example of the configuration of the fixed tubular part 106 in the present example, and shows an example of the configuration of the fixed tubular part 106 together with the shaft part 108 in the case where the outer peripheral recesses-projections 204 as described above with reference to FIG. 7 are formed, for example. In FIG. 9, the upper view is a perspective view of the entire fixed tubular part 106 and a portion A. The lower view is a side view of the entire fixed tubular part 106 and a portion B.

As can be understood from the comparison with the fixed tubular part 606 shown in FIG. 8, in the fixed tubular part 106 of the present example, the shapes of the outer peripheral recesses-projections 204 and the projection 222 of the outer peripheral recesses-projections 204 in the vicinity of the end part of the fixed tubular part 106 on the side close to the rotating tubular part 124 (see FIG. 3(a) and FIG. 3(b)) are different from those shown in FIG. 8. In this case, the side close to the rotating tubular part 124 is the side close to the rotating tubular part 124 in the state in which the impact position adjusting part 22 has been assembled. Further, specifically, as described above, in the present example, in the vicinity of the end part of the fixed tubular part 106, the width of the projection 222 gradually decreases and the depth and the width of the recess 224 gradually increase toward the end part. In this case, the depth of the recess 224 may be, for example, a depth based on the height of the outer peripheral surface of the fixed tubular part 106 before the recess 224 is formed.

Here, in the fixed tubular part 606 shown in FIG. 8 and the fixed tubular part 106 shown in FIG. 9, a chamfering process is performed on a portion at which the outer peripheral surface and the end surface are connected in the vicinity of the end part on the side close to the rotating part 102. In this case, the depth of the recess (recess 624 or recess 224) in the vicinity of the end part may be, for example, the depth based on the position at which the outer peripheral surface is located as in the case where the chamfering process is not performed. Further, in FIG. 8 and FIG. 9, the shapes of the outer peripheral recesses-projections 612 and the outer peripheral recesses-projections 204 are difficult to read from the figures due to the influence of the chamfering process. Therefore, in the following, with reference to FIG. 10(a), FIG. 10(b), FIG. 10(c), FIG. 11(a), FIG. 11(b), and FIG. 11(c), the shapes of the outer peripheral recesses-projections 612 of the fixed tubular part 606 and the outer peripheral recesses-projections 204 of the fixed tubular part 106 shown in FIG. 8 and FIG. 9 will be described in more detail.

Figure 10A:
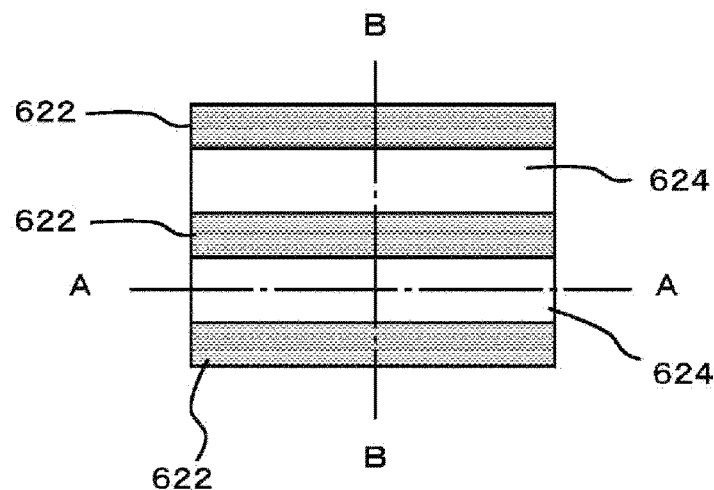
FIG. 10(a), FIG. 10(b), and FIG. 10(c) are simplified views showing shapes of a projection 622 and a recess 624 of the outer peripheral recesses-projections 612 of the fixed tubular part 606.
Figure 10B:
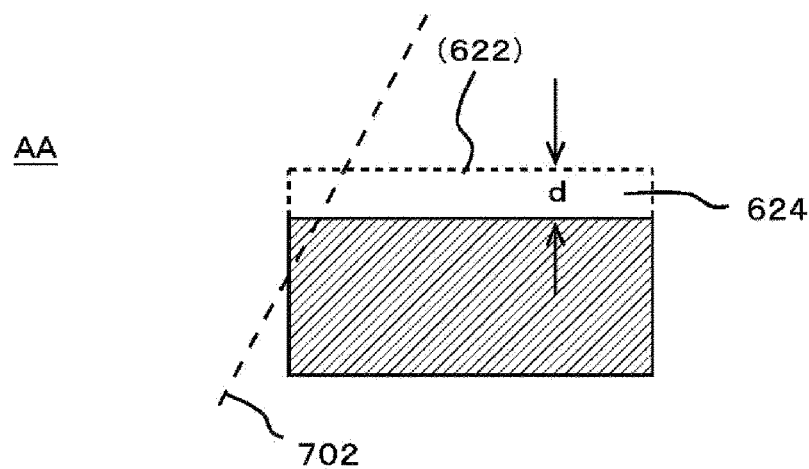
Figure 10C:
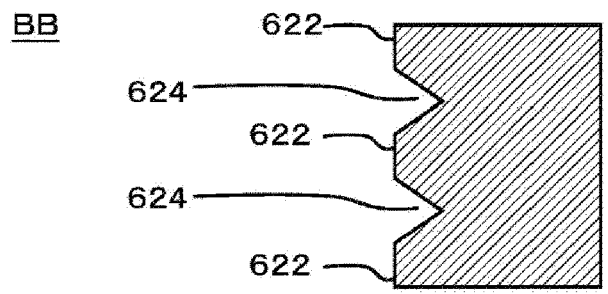
Figure 11A:
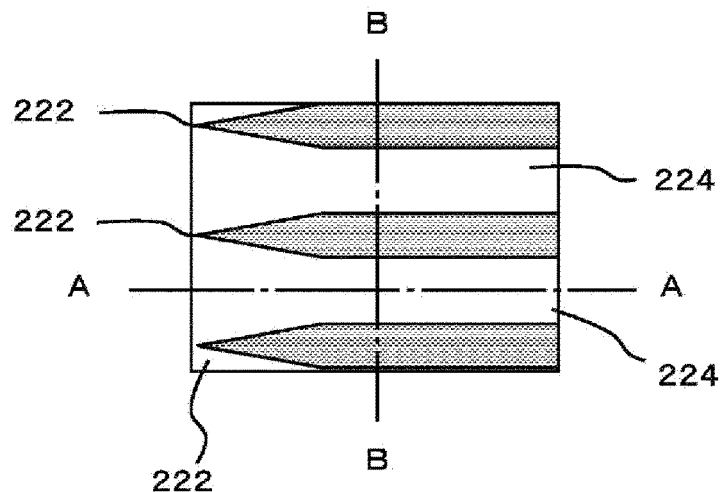
FIG. 11(a), FIG. 11(b), and FIG. 11(c) are simplified views showing the shapes of the projection 222 and the recess 224 of the outer peripheral recesses-projections 204 of the fixed tubular part 106.
Figure 11B:
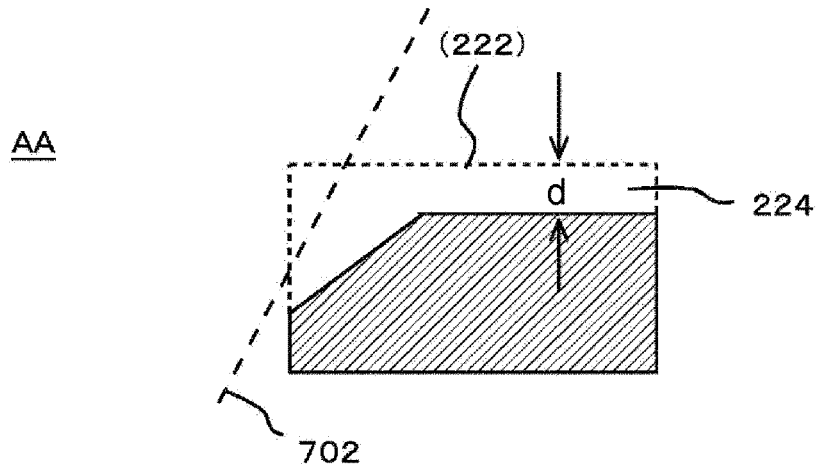
Figure 11C:
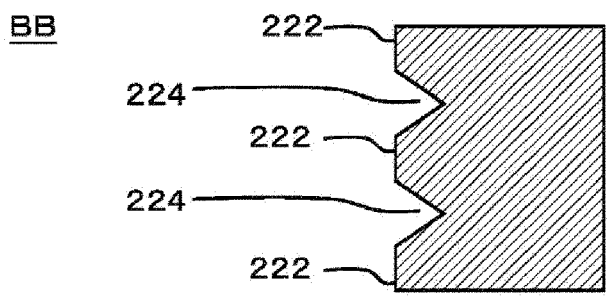

FIG. 10(a), FIG. 10(b), and FIG. 10(c) are simplified views showing the shapes of the projection 622 and the recess 624 of the outer peripheral recesses-projections 612 (see FIG. 8) of the fixed tubular part 606 shown in FIG. 8. FIG. 10(a) is a top view showing the projection 622 and the recess 624 as viewed from the normal direction of the outer peripheral surface of the fixed tubular part 606. FIG. 10(b) and FIG. 10(c) are cross-sectional views at positions of line AA and line BB shown in dot-dashed lines in FIG. 10(a). FIG. 11(a), FIG. 11(b), and FIG. 11(c) are simplified views showing the shapes of the projection 222 and the recess 224 of the outer peripheral recesses-projections 204 (see FIG. 9) of the fixed tubular part 106 shown in FIG. 9. FIG. 11(a) is a top view showing the projection 222 and the recess 224 as viewed from the normal direction of the outer peripheral surface of the fixed tubular part 106. FIG. 11(b) and FIG. 11(c) are cross-sectional views at positions of line AA and line BB shown in in dot-dashed lines in FIG. 11(a).

In FIG. 10(a), FIG. 10(b), FIG. 10(c), FIG. 11(a), FIG. 11(b), and FIG. 11(c), for convenience of illustration, the shapes of the projection 622, the recess 624, the projection 222, the recess 224, and the like are shown with various simplifications. Specifically, in FIG. 10(a), FIG. 10(b), FIG. 10(c), FIG. 11(a), FIG. 11(b), and FIG. 11(c), the scale in each direction is appropriately changed so that the characteristics of each part can be easily understood. Further, in these figures, considering that the outer peripheral surfaces of the fixed tubular part 606 and the fixed tubular part 106 may be regarded as being substantially flat in a narrow range, a part of the fixed tubular part 606 and the fixed tubular part 106 is shown excluding the influence of the curvature of the outer peripheral surface. Further, in order to prevent the shape of each part from becoming difficult to understand due to the influence of the chamfering process, the shape of each part as in the case where the chamfering process is omitted is shown in the figures. When the chamfering process is actually performed, the position shown by a broken line 702 in FIG. 10(b) and FIG. 11(b) is the position of the chamfering process.

As can be understood from the configuration shown in FIG. 10(a), FIG. 10(b), and FIG. 10(c), in the fixed tubular part 606 shown in FIG. 8, the depth of the recess 624 is constant over the entire recess 624, as shown by a depth d in FIG. 10(b). Then, in this case, the width of the recess 624 is also constant over the entire recess 624 at each position in the depth direction. As a result, the width of the projection 622, which is the portion between the recesses 624, is also constant over the entire projection 622.

In contrast, in the case of the fixed tubular part 106 of the present example, for example, as shown in FIG. 11(b), in the vicinity of the end part on one side close to the rotating tubular part 124 (see FIG. 3(a) and FIG. 3(b)) in the impact position adjusting part 22 (see FIG. 3(a) and FIG. 3(b)), the depth of the recess 224 gradually increases toward the end part. Further, as described above, in the present example, the recess 224 is a recess in the shape of a V-shaped groove of which the width gradually increases as the distance from the bottom increases. Then, in this case, with the position of the bottom of the recess 224 gradually becoming deeper toward the end part in the vicinity of the end part, the width of the recess 224 also gradually increases toward the end part. Specifically, in this case, at each position in the depth direction, the width of the recess 224 gradually increases toward the end part. As a result, the width of the projection 222, which is the portion between the recesses 224, gradually decreases toward the end part as shown in FIG. 11(a), for example. By using the fixed tubular part 106 formed with the projection 222 having such a shape, as described above, for example, when moving the rotating operation part 122 (see FIG. 3(a) and FIG. 3(b)) from the rotatable position to the rotation prohibited position, the inner peripheral recesses-projections 202 (see FIG. 3(a) and FIG. 3(b)) of the rotating tubular part 124 (see FIG. 3(a) and FIG. 3(b)) and the outer peripheral recesses-projections 204 of the fixed tubular part 106 can be appropriately and naturally engaged with each other. Accordingly, for example, it is possible to appropriately prevent giving the user an impression of being in the locked state while it is actually in the unlocked state.

Here, as can be understood from the above description, in the fixed tubular part 106 of the present example, the depth of the recess 224 may be constant except in the vicinity of one end part. Therefore, regarding the shape of the recess 224, for example, the depth may gradually change in the vicinity of one end part, and the depth may be constant in the other portion. Further, as described above, in the fixed tubular part 106, a chamfering process may be performed on the portion at which the outer peripheral surface and the end surface are connected. Then, in this case, the chamfering process may cause a change in the shape of a part of the recess 224. However, in this case, as can be understood from FIG. 11(b), for example, the depth and the width of the recess 224 may gradually increase toward the end part. Further, in this case, for example, as shown in FIG. 11(b), the depth of at least a part of the recess 224 in the vicinity of the end part may be made deeper than the portion removed by the chamfering process. Further, in this case, the shape of the recess 224 may also be recessed from the chamfered surface, i.e., the surface that is chamfered, for example. "Being recessed from the chamfered surface" may mean, for example, that a dent forming a part of the recess 224 is formed on the chamfered surface. By forming the recess 224 having such a shape, for example, the widths of the projection 222 and the recess 224 can be appropriately changed in the vicinity of the end part of the fixed tubular part 106.

Figure 12A:
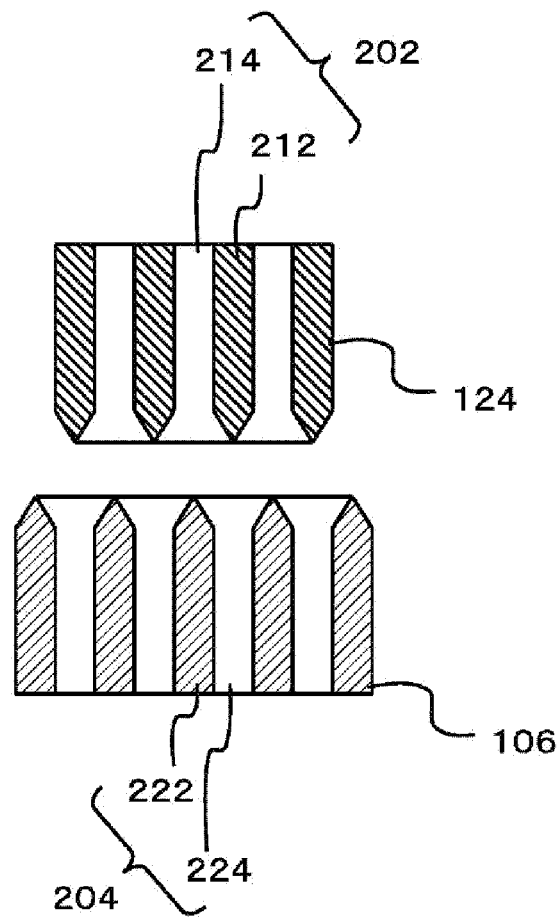
FIG. 12(a) and FIG. 12(b) are views showing modified examples of the configuration of the impact position adjusting part 22.
Figure 12B:
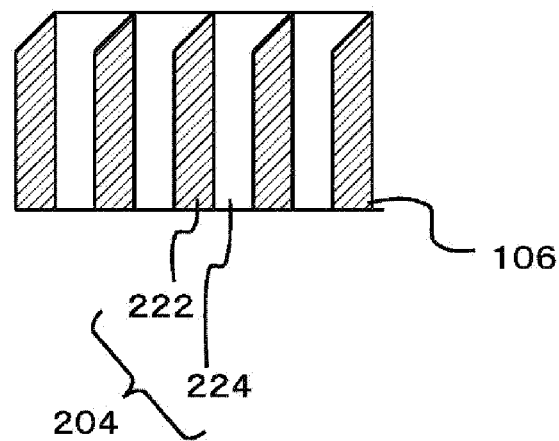

Next, modified examples associated with the configuration described above will be described. FIG. 12(*a*) and FIG. 12(*b*) are views showing modified examples of the configuration of the impact position adjusting part 22 (see FIG. 3(*a*) and FIG. 3(*b*)). FIG. 12(*a*) shows a modified example of the configuration of the rotating tubular part 124 in the impact position adjusting part 22. FIG. 12(*b*) shows a modified example of the configuration of the fixed tubular part 106 in the impact position adjusting part 22. Except for points described below, in FIG. 12(*a*) and FIG. 12(*b*), the configurations labeled with the same reference numerals as those in FIG. 1 to FIG. 11(*c*) may have the same or similar characteristics as the configurations in FIG. 1 to FIG. 11(*c*).

In the above description, among the rotating tubular part 124 and the fixed tubular part 106 used to realize the locking function in the impact position adjusting part 22, the configuration in which the widths of the projection 222 and the recess 224 on the side of the fixed tubular part 106 are gradually changed toward the end part has mainly been described. However, in the modified example of the configuration of the impact position adjusting part 22, as shown in FIG. 12(*a*), for example, the widths of the projection 212 and the recess 214 on the side of the rotating tubular part 124 may also be gradually changed toward the end part. In this case, for example, the inner peripheral recesses-projections 202 of the rotating tubular part 124 may have a projection 212 of which the width gradually decreases toward the end part in the vicinity of the end part on the side close to the fixed tubular part 106. Further, for example, the width of the recess 214 of the inner peripheral recesses-projections 202 may gradually increase toward the end part. Similarly, in this configuration, for example, when moving the rotating operation part 122 (see FIG. 3(*a*) and FIG. 3(*b*)) from the rotatable position to the rotation prohibited position, the inner peripheral recesses-projections of the rotating tubular part 124 and the outer peripheral recesses-projections 204 of the fixed tubular part 106 can be appropriately and naturally engaged with each other. Further, for example, the shapes of the projection 212 and the recess 214 in the rotating tubular part 124 may also be shapes the same as or similar to the modified example of the configuration of the fixed tubular part 106 to be described below. Further, in a further modified example of the configuration of the impact position adjusting part 22, for example, the widths of the projection 222 and the recess 224 in the fixed tubular part 106 may be made constant, and only the widths of the projection 212 and the recess 214 of the rotating part 102 may be gradually changed.

Further, in a modified example of the configuration of the impact position adjusting part 22, for example, the widths of the projection 222 and the recess 224 of the outer peripheral recesses-projections 204 of the fixed tubular part 106 may be changed with a shape different from the specific configuration described above. Specifically, in the above description, the shapes of the projection 222 and the recess 224 have been mainly described as ones in which the pattern on one side and the pattern on the other side in the circumferential direction of the outer peripheral surface are the same (symmetrical). However, for example, as shown in FIG. 12(*b*), in the shape of the projection 222 or the recess 224, the pattern on one side and the pattern on the other side in the circumferential direction of the outer peripheral surface may be different. Similarly, in this case, by using the projection 222 of which the width gradually decreases toward the end part, for example, the inner peripheral recesses-projections 202 of the rotating tubular part 124 and the outer peripheral recesses-projections 204 of the fixed tubular part 106 can be appropriately and naturally engaged with each other.

Further, in the above description, the configuration in which the width is changed with respect to only a part of the projection 222 and the recess 224 has been mainly described. However, in a further modified example of the configuration of the impact position adjusting part 22, for example, the width of the projection 222 or the recess 224 of the outer peripheral recesses-projections 204 of the fixed tubular part 106 may be gradually changed over the entire projection 222 or recess 224. Similarly, in this case, by gradually decreasing the width of the projection 222 toward the end part at least in the vicinity of the end part, for example, the inner peripheral recesses-projections 202 of the rotating tubular part 124 and the outer peripheral recesses-projections 204 of the fixed tubular part 106 can be appropriately and naturally engaged with each other.

Further, in the above description, the configuration in which the inner peripheral recesses-projections 202 are formed on the inner peripheral surface of the rotating tubular part 124 and the outer peripheral recesses-projections 204 are formed on the outer peripheral surface of the fixed tubular part 106 has been mainly described. However, in a modified example of the configuration of the impact position adjusting part 22, for example, the outer peripheral surface of the rotating tubular part 124 is formed with outer peripheral recesses-projections the same as or similar to the outer peripheral recesses-projections 204 described above, the inner peripheral surface of the fixed tubular part 106 is formed with inner peripheral recesses-projections the same as or similar to the inner peripheral recesses-projections 202 described above, and the locking function may be realized by engaging the outer peripheral recesses-projections with the inner peripheral recesses-projections. Further, in this case, for example, the rotating tubular part 124 may be an example of the first tubular part and the fixed tubular part 106 may be an example of the second tubular part. Similarly, in the case of this configuration, for example, the outer peripheral recesses-projections of the rotating tubular part 124 and the inner peripheral recesses-projections of the fixed tubular part 106 can be appropriately and naturally engaged with each other.

Further, in the above description, among the configurations which are examples of the operation adjusting part of the optical sight 10, the configuration of the impact position adjusting part 22 has been mainly described. In this regard, in the case of adjustment associated with the perception of the target object with the optical sight 10 such as the adjustment with the focus adjusting part 24 (see FIG. 1), for example, if an unintended deviation occurs after the adjustment, the user may easily notice the deviation by seeing a change in the perception of the target object. In contrast, in the case of the adjustment with the impact position adjusting part 22, even if an unintended deviation occurs after the adjustment, it may be difficult for the user to notice. Therefore, with the impact position adjusting part 22, if the user is given an impression that locking has been completed while it is actually in the unlocked state, the user's hand or an object may unintentionally touch the impact position adjusting part 22 and cause a deviation to the adjustment result, and the deviation tends to remain unnoticed by the user. Therefore, it is particularly important to prevent such misrecognition in the impact position adjusting part 22. However, it is possible to also prevent such misrecognition of the lock mechanism in parts other than the impact position adjusting part 22. Therefore, in the optical sight 10, the configuration of an operation adjusting part other than the impact position adjusting part 22 may also use a lock mechanism the same as or similar to the lock mechanism of the impact position adjusting part 22 described above. In this case, for example, the configurations of the focus adjusting part 24 and the illumination adjusting part 26 may suitably be configurations having the same or similar lock mechanism as described above. With this configuration, for example, it is possible to appropriately realize an operation adjusting part that can be locked more appropriately.

Further, when considering more generally, the same or similar lock mechanism as the impact position adjusting part 22 of the present example may be suitably used in an operation adjusting part of an optical device other than the optical sight 10. Specifically, in optical devices such as binoculars and telescopes, operation adjusting parts associated with this function may use a configuration having a lock mechanism the same as or similar to the lock mechanism of the impact position adjusting part 22 described above. With such a configuration, for example, it is possible to appropriately realize a configuration capable of performing adjustment more appropriately to a configuration for adjusting the functions of the optical device.

What is claimed is:

1. An optical device, which is an optical device enabling a user to visually recognize a target object, comprising:
    an optical system that enables the user to visually recognize the target object;
    a housing that houses the optical system; and
    an operation adjusting part that adjusts a function of the optical device according to an operation of the user,
    wherein the operation adjusting part comprises:
    a rotating operation part that rotates according to an operation of the user;
    an adjusting mechanism that adjusts the function of the optical device by moving a part of the optical device according to an amount of rotation of the rotating operation part;
    a first tubular part in a tubular shape, formed with recesses-projections on at least a part of an outer peripheral surface; and
    a second tubular part in a tubular shape, formed with inner peripheral recesses-projections on at least a part of an inner peripheral surface, the inner peripheral recesses-projections being recesses-projections having a shape that engages with outer peripheral recesses-projections which are the recesses-projections on the outer peripheral surface of the first tubular part,
    wherein a rotating side tubular part, which is one of the first tubular part and the second tubular part, has an axial direction parallel to a rotation axis of the rotating operation part and has a position fixed to the rotating operation part to rotate together with the rotating operation part,
    another of the first tubular part and the second tubular part has an axial direction aligned with the rotating side tubular part and is arranged at a position fixed to the housing,
    the outer peripheral recesses-projections of the first tubular part are recesses-projections of which projections and recesses extending in a direction parallel to an axial direction of the first tubular part are alternately arranged in a circumferential direction of the outer peripheral surface,
    the rotating operation part is capable of moving forward and backward in a direction parallel to the axial direction of the first tubular part, and according to an operation of the user, moves together with the rotating side tubular part to at least a rotatable position at which rotation of the rotating operation part is made possible by separation between the outer peripheral recesses-projections and the inner peripheral recesses-projections, and a rotation prohibited position at which rotation of the rotating operation part is prohibited by engagement between the outer peripheral recesses-projections and the inner peripheral recesses-projections, and
    at least in a vicinity of an end part on a side close to the second tubular part, a width of the projection of the outer peripheral recesses-projections of the first tubular part gradually decreases toward the end part,
    wherein at least in the vicinity of the end part on the side close to the second tubular part, a depth and a width of the recess of the outer peripheral recesses-projections of the first tubular part gradually increase toward the end part.

2. The optical device according to claim 1, wherein
    the optical device is an optical sight used by being attached to a gun, and
    the operation adjusting part is an adjusting part for performing impact position adjustment.

3. The optical device according to claim 1, wherein
    the rotating side tubular part is the second tubular part,
    at least at a part other than the vicinity of the end part on the side close to the second tubular part, the projections of the outer peripheral recesses-projections of the first tubular part are arranged at a constant cycle in the circumferential direction with a constant width in the circumferential direction, and
    when moving the rotating operation part from the rotatable position to the rotation prohibited position, the outer peripheral recesses-projections of the first tubular part guide movement of the second tubular part by the projections of which the width gradually decreases toward the end part on the side close to the second tubular part so that the outer peripheral recesses-projections and the inner peripheral recesses-projections are engaged with each other.

4. The optical device according to claim 1, wherein
    the recess of the outer peripheral recesses-projections of the first tubular part is a recess in a shape of a V-shaped groove of which a width gradually increases as a distance from a bottom increases, and
    at least in the vicinity of the end part on the side close to the second tubular part, with a position of the bottom of the recess in a shape of a V-shaped groove gradually becoming deeper toward the end part, the depth and the width of the recess of the outer peripheral recesses-projections of the first tubular part gradually increase toward the end part.

5. A method of manufacturing a tubular part-using product, wherein the product is optical device according to claim 1, the method comprising:
- a first tubular part creating step of creating the first tubular part in the tubular shape, formed with the recesses-projections on at least the part of the outer peripheral surface; and
- a second tubular part creating step of creating the second tubular part in the tubular shape, formed with the inner peripheral recesses-projections on at least the part of the inner peripheral surface, the inner peripheral recesses-projections being the recesses-projections having the shape that engages with the outer peripheral recesses-projections which are the recesses-projections on the outer peripheral surface of the first tubular part, in the first tubular part creating step,
- a cutting tool having a blade for cutting is used,
- with the blade pressed against the first tubular part to be processed, by moving the blade relative to the first tubular part in a direction gradually away from a central axis of the first tubular part while advancing in a direction parallel to the axial direction of the first tubular part, a part of the recess of the outer peripheral recesses-projections of the first tubular part is formed, and
- afterwards, with the blade pressed against the first tubular part, by keeping a distance from the central axis of the first tubular part constant and moving the blade relative to the first tubular part, another part of the recess of the outer peripheral recesses-projections is formed.

6. The method of manufacturing a tubular part-using product according to claim 5, wherein the blade of the cutting tool is a blade in a shape that forms a recess in a shape of a V-shaped groove of which a width gradually increases as a distance from a bottom increases by moving relative to a work piece while being pressed against the work piece.

* * * * *